US012537897B2

(12) United States Patent
Wu et al.

(10) Patent No.: US 12,537,897 B2
(45) Date of Patent: Jan. 27, 2026

(54) INCOMING CALL PROMPTING METHOD AND ELECTRONIC DEVICE

(71) Applicant: Huawei Technologies Co., Ltd., Shenzhen (CN)

(72) Inventors: Xia Wu, Shenzhen (CN); Binghan Jiang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 387 days.

(21) Appl. No.: 18/190,401

(22) Filed: Mar. 27, 2023

(65) Prior Publication Data
US 2023/0239396 A1 Jul. 27, 2023

Related U.S. Application Data

(63) Continuation of application No. PCT/CN2021/116070, filed on Sep. 1, 2021.

(30) Foreign Application Priority Data

Sep. 27, 2020 (CN) .......................... 202011031963.X

(51) Int. Cl.
H04M 1/72484 (2021.01)
H04M 1/02 (2006.01)
H04M 1/72454 (2021.01)

(52) U.S. Cl.
CPC ..... H04M 1/72484 (2021.01); H04M 1/0216 (2013.01); H04M 1/0268 (2013.01); H04M 1/72454 (2021.01)

(58) Field of Classification Search
CPC ........... H04M 1/72484; H04M 1/0216; H04M 1/0268; H04M 1/72454; H04M 1/0214; H04M 1/0243; G06F 1/1652; G06F 1/1677; G09F 9/301
See application file for complete search history.

(56) References Cited

U.S. PATENT DOCUMENTS

2012/0083319 A1* 4/2012 Sirpal .................. G06F 1/1694
455/566
2014/0310643 A1* 10/2014 Karmanenko ........ G06F 1/1626
455/566
2018/0020320 A1* 1/2018 Choi ..................... H04W 76/14
(Continued)

FOREIGN PATENT DOCUMENTS

CN 101175195 A 5/2008
CN 107465830 A 12/2017
(Continued)

Primary Examiner — Angelica Perez
(74) Attorney, Agent, or Firm — Conley Rose, P.C.

(57) ABSTRACT

An incoming call prompting method includes an electronic device that receives a call request from a contact, and when a flexible screen of the electronic device is in a folded state, the electronic device determines, in response to the call request, a target screen corresponding to the call request, where the target screen is a first screen or a second screen of the flexible screen; the electronic device displays an answer button on the target screen; and the electronic device displays prompt information of the call request on a non-target screen, where the prompt information prompts a user to answer the current call request using the answer button displayed on the target screen.

20 Claims, 18 Drawing Sheets

(56) References Cited

U.S. PATENT DOCUMENTS

| | | | |
|---|---|---|---|
| 2018/0039410 A1* | 2/2018 | Kim | G06F 1/1652 |
| 2018/0288220 A1* | 10/2018 | Yin | H04M 1/72469 |
| 2019/0042066 A1 | 2/2019 | Kim et al. | |
| 2021/0099570 A1* | 4/2021 | Schenone | G06F 3/0488 |
| 2021/0208831 A1* | 7/2021 | Zhang | H04N 23/633 |

FOREIGN PATENT DOCUMENTS

| | | |
|---|---|---|
| CN | 110602315 A | 12/2019 |
| CN | 111131553 A | 5/2020 |
| CN | 111641748 A | 9/2020 |
| EP | 2977850 A1 | 1/2016 |
| EP | 3779643 A1 | 2/2021 |
| WO | 2019227752 A1 | 12/2019 |

* cited by examiner

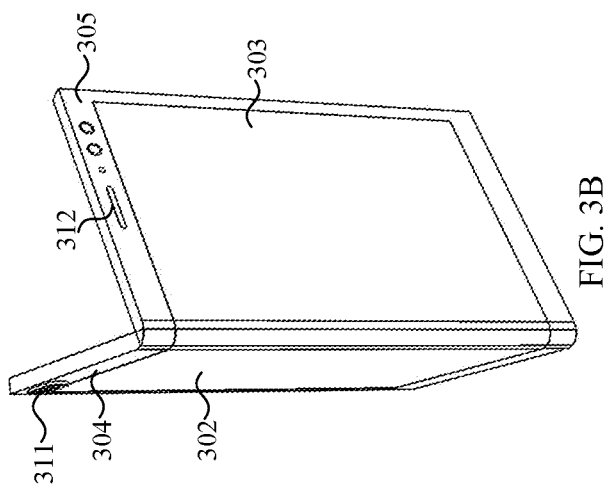
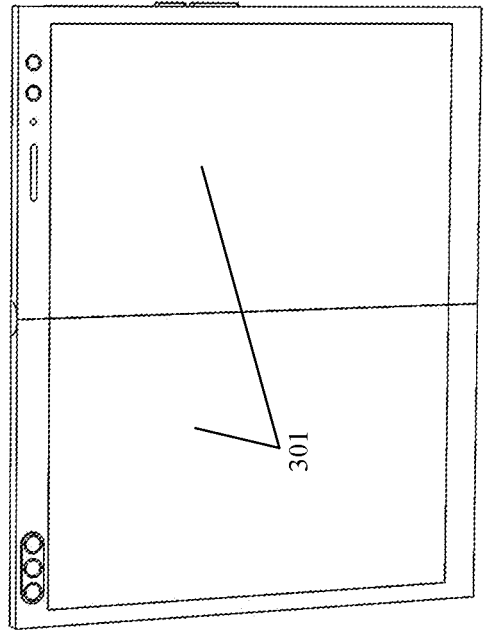
FIG. 3B
FIG. 3A

Receive a call request 1

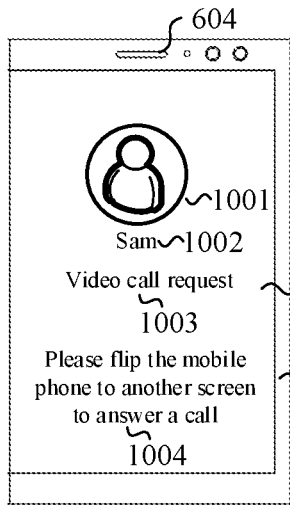 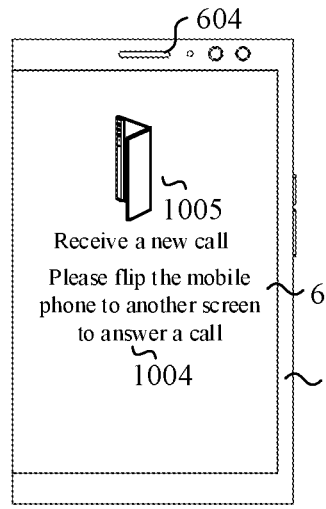 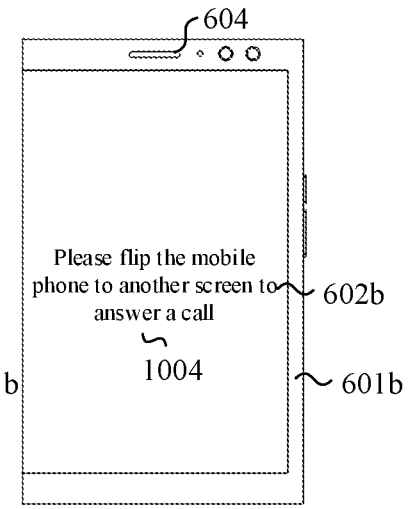
FIG. 10A    FIG. 10B    FIG. 10C
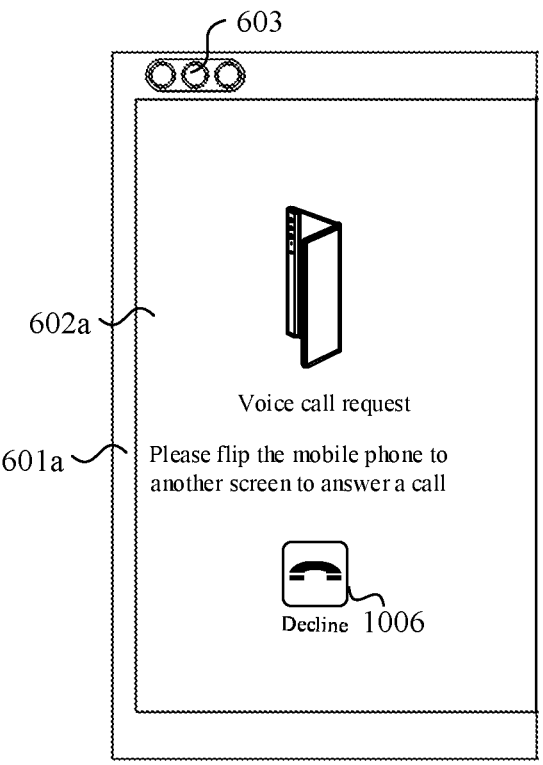
FIG. 11

INCOMING CALL PROMPTING METHOD AND ELECTRONIC DEVICE

CROSS-REFERENCE TO RELATED APPLICATIONS

This is a continuation of International Patent Application No. PCT/CN2021/116070 filed on Sep. 1, 2021, which claims priority to Chinese Patent Application No. 202011031963.X filed on Sep. 27, 2020. The disclosures of the aforementioned applications are hereby incorporated by reference in their entireties.

TECHNICAL FIELD

This disclosure relates to the field of terminal technologies, and in particular, to an incoming call prompting method and an electronic device.

BACKGROUND

Some manufacturers have applied a flexible screen to an electronic device such as a mobile phone or a tablet computer. When using such an electronic device, a user may fold a display along a folding line by a specific angle. As shown in FIG. 1, when one folding line is disposed on a flexible screen, the flexible screen may be divided into a first screen 101 and a second screen 102 after being folded. In a working process of the flexible screen, the first screen 101 and the second screen 102 may display same or different content.

In a call scenario, if an electronic device (for example, a mobile phone) provided with a flexible screen receives a call request from a contact, the mobile phone may present incoming call information such as a name and a phone number of the contact and an answer button or a decline button on the flexible screen, to prompt the user to answer the call request. For example, if an earpiece 103 is disposed on a mobile phone panel on which the first screen 101 is located, but no earpiece is disposed on a mobile phone panel on which the second screen 102 is located, the mobile phone may display the incoming call information on the first screen 101 by default, to help the user answer a current call by using the first screen 101 and the earpiece 103.

However, because the incoming call information keeps being displayed on the first screen 101, when the first screen 101 is not within a line-of-sight range of the user, if the mobile phone receives the call request of the contact, the user cannot see the incoming call information on the first screen 101, and consequently cannot perceive the call request from the contact possibly, causing missing of a call from the contact.

SUMMARY

This disclosure provides an incoming call prompting method and an electronic device, to guide, on a flexible screen, a user to use a proper screen to process a call request from a contact, thereby reducing missed calls.

To achieve the foregoing objective, the following technical solutions are used in this disclosure.

According to a first aspect, this disclosure provides an incoming call prompting method. The method may be applied to an electronic device having a flexible screen. When the flexible screen is in a folded state, the flexible screen is divided into a first screen and a second screen. The method includes that the electronic device receives a call request from a contact. When the flexible screen of the electronic device is in the folded state, the electronic device may determine a corresponding target screen in response to the call request. The target screen is the first screen or the second screen. Further, the electronic device may display an answer button on the target screen. The answer button is used to answer a current call request. In addition, the electronic device may display prompt information of the current call request on a non-target screen. The prompt information is used to prompt a user to answer the call request by using the answer button displayed on the target screen.

In other words, when the flexible screen of the electronic device is in the folded state, if the electronic device receives the call request from the contact, the electronic device may display, on one screen (that is, the target screen) of the flexible screen, incoming call information, for example, the answer button, used to process the current call request, and the electronic device may display, on the other screen (that is, the non-target screen) of the flexible screen, prompt information used to prompt the user to answer the current call request on the target screen. In this way, the user can perceive an incoming call of the contact on the target screen by using the incoming call information, and can further perceive the incoming call of the contact on the non-target screen by using the prompt information, to reduce missed calls.

In a possible implementation, when the flexible screen of the electronic device is in the folded state, the electronic device is also divided into a first body and a second body. For example, a first camera and the first screen may be disposed on a same side of the first body, and a first earpiece and the second screen may be disposed on a same side of the second body.

When the current call request is a video call request, because the user usually needs to use a camera during a video call and both the camera (that is, the first camera) and the first screen are disposed on the first body, the electronic device may determine that the target screen is the first screen and the non-target screen is the second screen. In this case, the prompt information displayed on the second screen may guide the user to use the first screen and the first camera in the first body to answer the current call request, in other words, guide the user to use a screen and a hardware component that are suitable for a current call to make the call.

When the current call request is a voice call request, because the user usually needs to use an earpiece during a voice call and both the earpiece (that is, the first earpiece) and the second screen are disposed on the second body, the electronic device may determine that the target screen is the second screen and the non-target screen is the first screen. In this case, the prompt information displayed on the first screen may guide the user to use the second screen and the first earpiece in the second body to answer the current call request, in other words, guide the user to use a screen and a hardware component that are suitable for a current call to make the call.

In a possible implementation, the prompt information may include at least one of a name of the contact, a profile picture of the contact, a call type of the call request, and a preset prompt, and the prompt may be used to prompt the user to flip the electronic device.

In a possible implementation, because the user does not depend on a component such as a camera or an earpiece when declining the call request, the prompt information may further include a decline button, and the decline button is used to decline the call request. In this case, the user may alternatively decline the current call request by using a decline button displayed on the non-target screen.

In a possible implementation, the electronic device may further display a decline button when displaying the answer button on the target screen. The decline button is used to decline the call request. In other words, the incoming call information displayed on the target screen may include the answer button and the decline button. Certainly, the incoming call information displayed on the target screen may further include controls such as the name and the profile picture of the contact.

In a possible implementation, that the electronic device displays prompt information of the call request on a non-target screen includes that the electronic device displays the prompt information of the call request on the non-target screen if the target screen is in a screen-locked state. In other words, when the flexible screen is in the folded state, the electronic device may further determine, based on a working status of each screen, a display policy corresponding to the current call request. If the target screen suitable for answering the current call request is in the screen-locked state, it indicates that the user does not use the target screen. Therefore, regardless of whether the non-target screen is in the screen-locked state or the unlocked state, the prompt information may be displayed on the non-target screen, to prompt the user to answer the current call request by using the target screen.

Correspondingly, if the target screen is in the unlocked state, it indicates that the user is using the target screen. In this case, there is a high probability that the incoming call information displayed by the electronic device on the target screen is perceived by the user. Therefore, the electronic device does not need to display the prompt information on the non-target screen. The non-target screen may continue to maintain a state existing before the call request is received, for example, the unlocked state or the screen-locked state. In this way, the electronic device may only needs to display the incoming call information on the target screen, so that the user can perceive a current incoming call, to reduce power consumption overheads increased when the electronic device displays the prompt information on the non-target screen.

In a possible implementation, that the electronic device displays prompt information of the call request on a non-target screen includes that the electronic device displays the prompt information of the current call request on the non-target screen if the non-target screen faces the user. In other words, when the flexible screen is in the folded state, the electronic device may further determine, based on a direction of each screen, a display policy corresponding to the current call request. If a screen facing the user is the non-target screen, it indicates that there is a high probability that the user perceives a current call by using the non-target screen. In this case, the electronic device may display the prompt information on the non-target screen, to prompt the user to answer the current call request by using the target screen.

Correspondingly, if the screen facing the user is the target screen, there is a high probability that the user can perceive the current call by using the incoming call information displayed on the target screen. Therefore, the electronic device does not need to display the prompt information on the non-target screen, and the non-target screen may continue to maintain a state existing before the call request is received, for example, the unlocked state or the screen-locked state, to reduce power consumption overheads increased when the electronic device displays the prompt information on the non-target screen.

The electronic device may identify, based on detection data reported by a sensor such as an acceleration sensor, a gyro camera, an infrared sensor, an optical proximity sensor, or a touch control component, a specific screen facing the user currently. For example, when the electronic device is in a static state, the electronic device may determine, based on a gravity direction detected by the acceleration sensor, that a screen facing upward is the screen facing the user.

In a possible implementation, that the electronic device displays prompt information of the call request on a non-target screen further includes that the electronic device may display the prompt information on the non-target screen in full screen, or the electronic device may display a first notification message on the non-target screen, where the first notification message includes the prompt information. For example, when the non-target screen is in the screen-locked state, the electronic device may display the prompt information on the non-target screen in full screen. For another example, when the non-target screen is in the unlocked state or a preset application (for example, a game application) runs on the non-target screen, the electronic device may display the prompt information on the non-target screen by using the first notification message, to reduce disturbance caused by the user to an application or a service that is running on the non-target screen.

For example, the first notification message may include the answer button and the decline button. In this case, when the preset application is running on the non-target screen, the user may directly process the current call request in the first notification message displayed on the non-target screen.

In a possible implementation, that the current call request is a voice call request is used as an example. The electronic device may first determine whether to connect to a preset audio output device (for example, a sound box). If the electronic device is not connected to the preset audio output device, a current voice call request depends on a component such as an earpiece on the electronic device. In this case, the electronic device may determine that a target screen corresponding to the current voice call request is the second screen.

Correspondingly, if the electronic device is connected to the preset audio output device, the user may use the audio output device to answer the current voice call request. Therefore, the electronic device does not need to display the prompt information. In this case, the electronic device may display incoming call information of the current voice call request on any screen (for example, the first screen and/or the second screen), and does not display prompt information of the current voice call request.

In a possible implementation, that the current call request is a video call request is used as an example. The electronic device may first determine whether to connect to a preset image input device (for example, a television with a camera). If the electronic device is not connected to the preset image input device, a current video call request depends on a component such as a camera on the electronic device. In this case, the electronic device may determine that a target screen corresponding to the current video call request is the first screen.

Correspondingly, if the electronic device is connected to the preset image input device, the user may use the image input device to answer the current video call request. Therefore, the electronic device does not need to display the prompt information. In this case, the electronic device may display incoming call information of the current voice call request on any screen (for example, the first screen and/or the second screen), and does not display prompt information of the current voice call request.

In a possible implementation, a second camera may be further disposed on the second body of the electronic device. When the current call request is a video call request, the electronic device may determine, based on a hardware parameter of the first camera and a hardware parameter of the second camera, the target screen corresponding to the call request. For example, the electronic device may determine, based on a parameter such as a quantity of lenses, resolution of a lens, or an angle of view, whether the first camera or the second camera is to be used to answer the current video call request. If it is determined to use the first camera to answer the current video call request, the target screen is the first screen, or if it is determined to use the second camera to answer the current video call request, the target screen is the second screen.

In a possible implementation, a second earpiece may be further disposed on the first body of the electronic device. When the current call request is a voice call request, the electronic device may determine, based on a hardware parameter of the first earpiece and a hardware parameter of the second earpiece, the target screen corresponding to the call request. For example, the electronic device may determine, based on a parameter such as a sampling rate of an earpiece, whether the first earpiece or the second earpiece is to be used to answer the current voice call request. If it is determined to use the first earpiece to answer the current voice call request, the target screen is the second screen, or if it is determined to use the second earpiece to answer the current voice call request, the target screen is the second screen.

In a possible implementation, the answer button and the decline button that are displayed by the electronic device on the target screen or the non-target screen have a display effect in an accidental touch avoidance mode. For example, in the non-accidental touch avoidance mode, the electronic device may set that tapping the answer button is an answer operation and tapping the decline button is a decline operation. In the accidental touch avoidance mode, the electronic device may set the answer operation as an operation of sliding the answer button to a preset location, and set the decline operation as an operation of sliding the decline button to a preset location, or the electronic device may reduce sizes of the answer button and the decline button, to reduce a possibility that the user wrongly operates the answer button and the decline button.

According to a second aspect, this disclosure provides an electronic device, including a flexible screen, one or more sensors, one or more processors, one or more memories, and one or more computer programs. The processor is coupled to each of the sensor, the flexible screen, and the memory. The one or more computer programs are stored in the memory. When the electronic device runs, the processor executes the one or more computer programs stored in the memory, so that the electronic device performs the incoming call prompting method according to any one of the foregoing implementations.

According to a third aspect, this disclosure provides a computer-readable storage medium, including computer instructions. When the computer instructions are run on an electronic device, the electronic device is enabled to perform the incoming call prompting method according to any implementation of the first aspect.

According to a fourth aspect, this disclosure provides a computer program product. When the computer program product runs on an electronic device, the electronic device is enabled to perform the incoming call prompting method according to any implementation of the first aspect.

It can be understood that the electronic device, the computer-readable storage medium, and the computer program product provided in the foregoing aspects are all configured to perform the foregoing provided corresponding method. Therefore, for beneficial effects that can be achieved by the electronic device, the computer-readable storage medium, and the computer program product, refer to the beneficial effects in the foregoing provided corresponding method. Details are not described herein again.

BRIEF DESCRIPTION OF DRAWINGS

FIGS. 3A-3B show a schematic diagram of a physical form of a flexible screen of an electronic device according to an embodiment of this disclosure;

FIGS. 10A-10C show a schematic diagram of an application scenario of an incoming call prompting method according to an embodiment of this disclosure;

FIG. 11 is a schematic diagram of an application scenario of an incoming call prompting method according to an embodiment of this disclosure;

DESCRIPTION OF EMBODIMENTS

The following describes implementations of embodiments in detail with reference to accompanying drawings.

An incoming call prompting method provided in an embodiment of this disclosure may be applied to an electronic device having a flexible screen, for example, a mobile phone, a tablet computer, a notebook computer, an ultra-mobile personal computer (UMPC), a handheld computer, a netbook, a personal digital assistant (PDA), a wearable device, or a virtual reality device. This is not limited in this embodiment of this disclosure.

Figure 1:
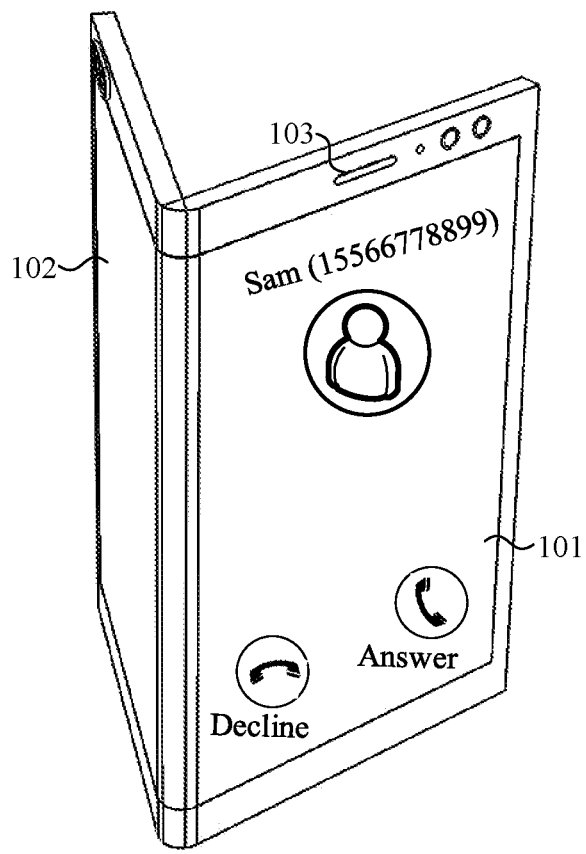
FIG. 1 shows an application scenario in which a flexible screen displays incoming call information in the conventional technology.
Figure 2:
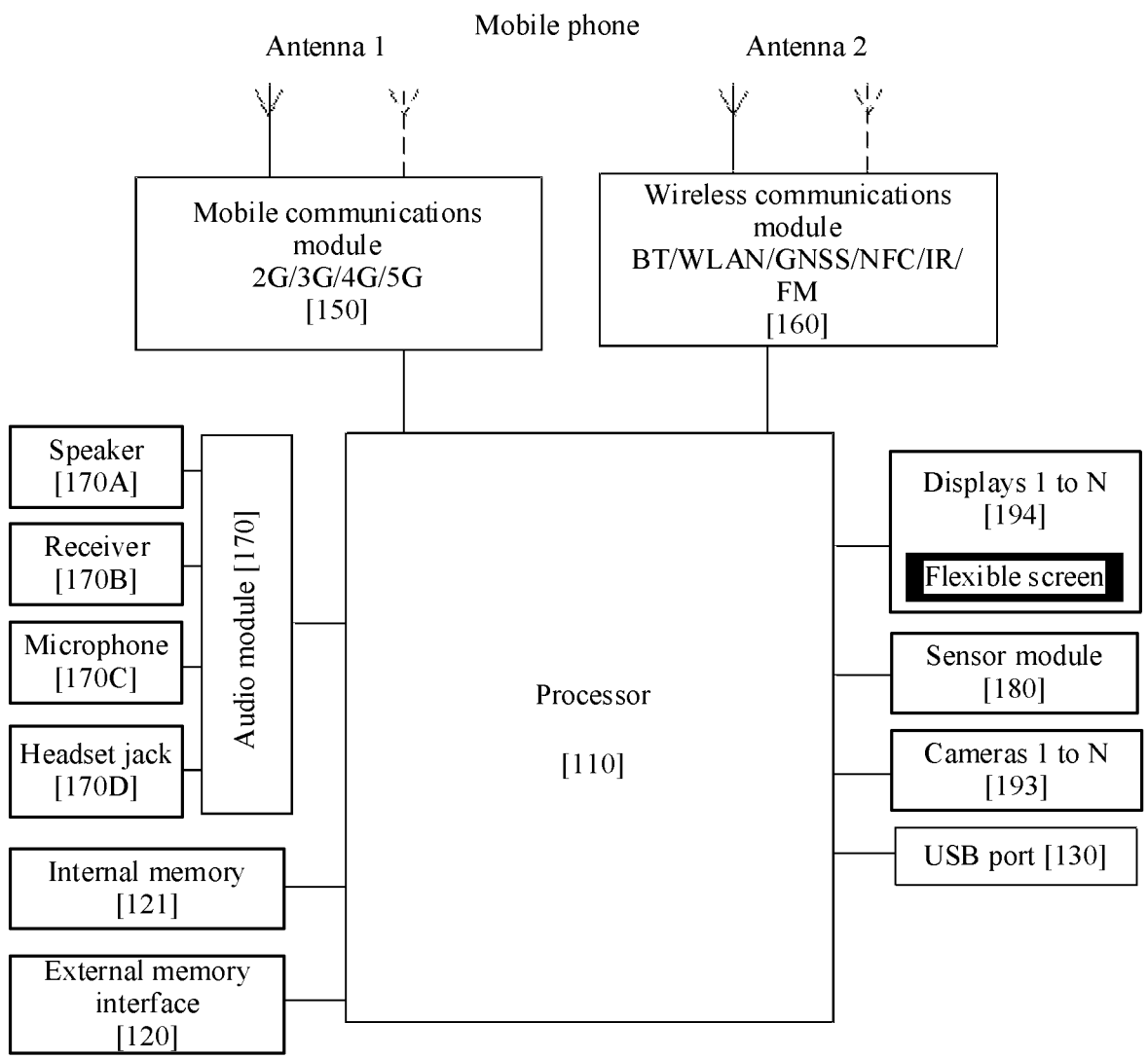
FIG. 2 is a schematic diagram of a structure of an electronic device according to an embodiment of this disclosure.

For example, the mobile phone is the electronic device. FIG. 2 is a schematic diagram of a structure of a mobile phone.

The mobile phone may include a processor 110, an external memory interface 120, an internal memory 121, a Universal Serial Bus (USB) port 130, an antenna 1, an antenna 2, a mobile communications module 150, a wireless communications module 160, an audio module 170, a speaker 170A, a receiver 170B, a microphone 170C, a headset jack 170D, a sensor module 180, and the like.

It can be understood that the structure shown in this embodiment of this disclosure does not constitute a specific limitation on the mobile phone. In some other embodiments of this disclosure, the mobile phone may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the processor 110 may directly invoke the instructions or the data from the memory. In this case, repeated access is avoided, a waiting time period of the processor 110 is reduced, and efficiency of a system is improved.

A wireless communication function of the mobile phone may be implemented by using the antenna 1, the antenna 2, the mobile communications module 150, the wireless communications module 160, the modem processor, the baseband processor, or the like.

The antenna 1 and the antenna 2 are configured to transmit and receive an electromagnetic wave signal.

The mobile communications module 150 may provide a wireless communication solution that is applied to the mobile phone and that includes second generation (2G)/third generation (3G)/fourth generation (4G)/fifth generation (5G) or the like. In some embodiments, at least some functional modules of the mobile communications module 150 may be disposed in the processor 110. In some embodiments, at least some functional modules of the mobile communications module 150 may be disposed in a same device as at least some modules of the processor 110.

The wireless communications module 160 may provide a wireless communication solution that is applied to the mobile phone and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like.

In some embodiments, the antenna 1 and the mobile communications module 150 of the mobile phone are coupled, and the antenna 2 and the wireless communications module 160 are coupled, so that the mobile phone may communicate with a network and another device by using a wireless communications technology.

The mobile phone implements a display function by using the GPU, a display 194, the application processor, or the like. The GPU is a microprocessor for image processing, and is connected to the display 194 and the application processor. The GPU is configured to perform mathematical and geometric computation, and is configured to perform graphics rendering. The processor 110 may include one or more GPUs, and execute program instructions to generate or change display information.

The display 194 is configured to display an image, a video, or the like. The display 194 includes a display panel. The display panel may be a liquid-crystal display (LCD), an organic light-emitting diode (LED) (or OLED), an active-matrix OLED (AMOLED), a flexible LED (FLED), a mini LED, a micro LED, a micro OLED, a quantum dot LED (QLED), or the like. In some embodiments, the mobile phone may include one or N displays 194, where N is a positive integer greater than 1.

The mobile phone may implement a photographing function by using the ISP, a camera 193, the video codec, the GPU, the display 194, the application processor, or the like.

The camera 193 is configured to capture a static image or a video. An optical image of an object is generated through the lens, and is projected onto a photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into a standard image signal in a format of red, green, and blue (RGB), luma, blue projection, and red projection (YUV), or the like. In some embodiments, the mobile phone may include one or N cameras 193, where N is a positive integer greater than 1.

The external memory interface 120 may be configured to be connected to an external storage card, for example, a micro Secure Digital (SD) card, to extend a storage capability of the mobile phone. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the mobile phone and data processing. The internal memory 121 may include a program storage area and a data storage area. The program storage area may store an operating system, an application (for example, a sound playing function or an image playing function) required by at least one function, and the like. The data storage area may store data (for example, audio data and an address book) created in a process of using the mobile phone, and the like. In addition, the internal memory 121 may include a high-speed random-access memory (RAM), and may further include a nonvolatile memory, for example, at least one magnetic disk storage device, a flash storage device, or a Universal Flash Storage (UFS).

The mobile phone may implement an audio function, for example, music playing and recording, through the audio module 170, the speaker 170A, the receiver 170B, the microphone 170C, the headset jack 170D, the application processor, or the like.

The audio module 170 is configured to convert digital audio information into an analog audio signal for output, and is further configured to convert an analog audio input into a digital audio signal. The audio module 170 may be further configured to encode and decode the audio signal. In some embodiments, the audio module 170 may be disposed in the processor 110, or some functional modules of the audio module 170 may be disposed in the processor 110.

The speaker 170A, also referred to as a "horn", is configured to convert an electrical audio signal into a sound signal. The mobile phone may listen to music or listen to a hands-free call by using the speaker 170A.

The receiver 170B, also referred to as an "earpiece", is configured to convert an electrical audio signal into a sound signal. When a call is answered or speech information is received through the mobile phone, the receiver 170B may be put close to a human ear to listen to a voice.

The microphone 170C, also referred to as a "mike" or a "mic", is configured to convert a sound signal into an electrical signal. When making a call or sending audio information, a user may make a sound near the microphone 170C through the mouth of the user, to input a sound signal into the microphone 170C. The mobile phone may be provided with at least one microphone 170C. In some other embodiments, the mobile phone may be provided with two microphones 170C, to collect a sound signal and implement a noise reduction function. In some other embodiments, the mobile phone may alternatively be provided with three, four, or more microphones 170C, to collect a sound signal, implement noise reduction, and identify a sound source, so as to implement a directional recording function, and the like.

The headset jack 170D is configured to be connected to a wired headset. The headset jack 170D may be a USB port 130, or may be a 3.5 millimeter (mm) open mobile terminal platform (OMTP) standard interface, or a cellular telecommunications industry association of the United States of America (USA) (CTIA) standard interface.

The sensor module 180 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

Certainly, the mobile phone may further include a charging management module, a power management module, a battery, a button, an indicator, one or more SIM card interfaces, and the like. This is not limited in this embodiment of this disclosure.

In this embodiment of this disclosure, the display panel of the display 194 of the mobile phone may be a flexible screen.

In FIG. 3A shows an unfolded state of a mobile phone having a flexible screen. A flexible screen 301 in the unfolded state may be used as a complete display area for display, and a user may fold the mobile phone along one or more folding lines on the flexible screen 301. A location of the folding line may be preset, or may be randomly selected by the user from the flexible screen 301.

In FIG. 3B shows a folded state of a mobile phone having a flexible screen. After the user folds the screen along the folding line on the flexible screen 301, the flexible screen 301 may be divided into a first screen 302 and a second screen 303 along the folding line. The first screen 302 and the second screen 303 may physically be a same screen or two screens. After the user folds the flexible screen 301 along the folding line, the first screen 302 and the second screen 303 may be disposed opposite to each other, or the first screen 302 and the second screen 303 may be away from each other. In other words, the user may fold the flexible screen 301 in an inward folding manner, or may fold the flexible screen 301 in an outward folding manner.

In some embodiments, when the user folds the flexible screen 301 of the mobile phone, the entire mobile phone is folded together with the flexible screen 301. Still as shown in FIG. 3B, when the flexible screen 301 is in a folded state, the mobile phone is divided into a first body 304 and a second body 305. For example, a camera 311 and the first screen 302 may be disposed on the first body 304, and the camera 311 and the first screen 302 are located on a same side of the first body 304, and an earpiece 312 and the second screen 303 may be disposed on the second body 305, and the earpiece 312 and the second screen 303 are located on a same side of the second body 305.

After the first screen 302 and the second screen 303 are folded, the user may independently use components such as the first screen 302 and the camera 311 on the first body 304 to implement various functions provided by the mobile phone, or may independently use components such as the second screen 303 and the earpiece 312 on the second body 305 to implement various functions provided by the mobile phone. Certainly, components such as a speaker, a distance sensor, an optical proximity sensor, or a fingerprint sensor may be further disposed on the first body 304 or the second body 305. This is not limited in this embodiment of this disclosure.

In addition, in addition to the first screen 302 and the second screen 303, the mobile phone may further include another screen. For example, after the user folds the flexible screen 301 of the mobile phone, a screen (or a side screen) of a bent part may also be used as an independent display area. In this case, the flexible screen 301 is divided into three independent display areas: the first screen 302, the second screen 303, and the side screen. Display of the side screen may be separately controlled, or the side screen may be displayed together with a main screen, or displayed together with a sub screen. This is not limited in the present disclosure.

In this embodiment of this disclosure, when the mobile phone receives a call request from a contact, the mobile phone may determine, based on a call type of a current call request with reference to a physical form of a current flexible screen and a location of a component such as an earpiece in the mobile phone, a target screen suitable for answering the current call request. For example, the target screen may be the first screen 302, the second screen 303, or the entire flexible screen 301.

For example, when the call type of the current call request is a video call type, during a video call, the user usually needs to use a camera of the mobile phone to collect a video image existing during the video call. Still as shown in FIG. 3B, because the camera 311 is disposed on the first body 304, and the first screen 302 is disposed on the first body 304, the mobile phone may determine the first screen 302 as the target screen.

For another example, when the call type of the current call request is a voice call type, during a voice call, the user usually needs to use an earpiece of the mobile phone to listen to voice content sent by the contact during the voice call. Still as shown in FIG. 3B, because the earpiece 312 is disposed on the second body 305, and the second screen 303 is disposed on the second body 305, the mobile phone may determine the second screen 303 as the target screen.

For another example, when the mobile phone receives the call request sent by the contact, the mobile phone may further first determine whether the physical form of the current flexible screen is the folded state or the unfolded state. If the current flexible screen is in the unfolded state, regardless of whether the call type of the current call request is a voice call type or a video call type, the mobile phone may determine the entire flexible screen 301 as the target screen.

After the mobile phone determines a target screen that matches the current call request, the mobile phone may display, on one or more screens, incoming call information, prompt information, and the like that are related to the current call request, to guide the user to answer the current call request by using the target screen.

Figure 4:
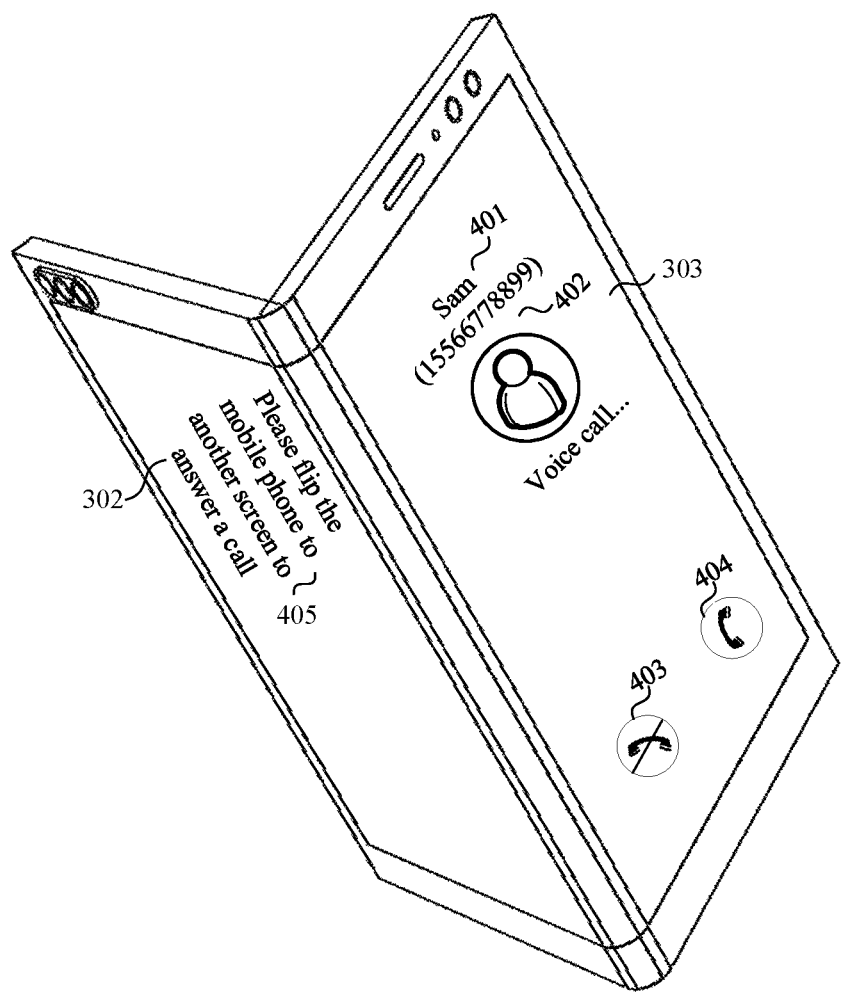
FIG. 4 is a schematic diagram of an application scenario of an incoming call prompting method according to an embodiment of this disclosure.

For example, as shown in FIG. 4, when the target screen is the second screen 303, the mobile phone may display, on the second screen 303, incoming call information such as a name 401 and a phone number 402 of the contact, an answer button 403, and a decline button 404 in the current call request (for example, the voice call request). Certainly, the incoming call information may further include a profile picture of the contact, and the like. This is not limited in this embodiment of this disclosure. In addition, the mobile phone may display, on the first screen 302 (that is, a non-target screen), prompt information 405 used to prompt the user to answer a current call on the second screen 303.

In this case, if the second screen 303 is within a line-of-sight range of the user, the user may perceive a call request of a current voice call by using the incoming call information on the second screen 303, and then answer the current voice call by using the components such as the second screen 303 and the earpiece 312 on the second body 305. If the first screen 302 is within a line-of-sight range of the user, the user may perceive the current call request by using the prompt information 405 on the first screen 302, and use, under guidance of the prompt information 405, the second screen 303 (that is, the target screen) to answer the current call. In this way, in an incoming call scenario, the user can perceive the call request from the contact from the flexible screen in a timely manner, and can further make a call by using a screen and a hardware component (for example, an earpiece or a camera) that are suitable for the current call, to reduce a case in which the user does not perceive the call request and misses an incoming call, and improve user experience of using the mobile phone provided with a flexible screen in an incoming call scenario.

A layered architecture, an event-driven architecture, a microkernel architecture, a microservice architecture, or a cloud architecture may be used for a software system of the mobile phone 100. In this embodiment of this disclosure, an Android system with a layered architecture is used as an example to illustrate a software structure of the mobile phone 100.

Figure 5:
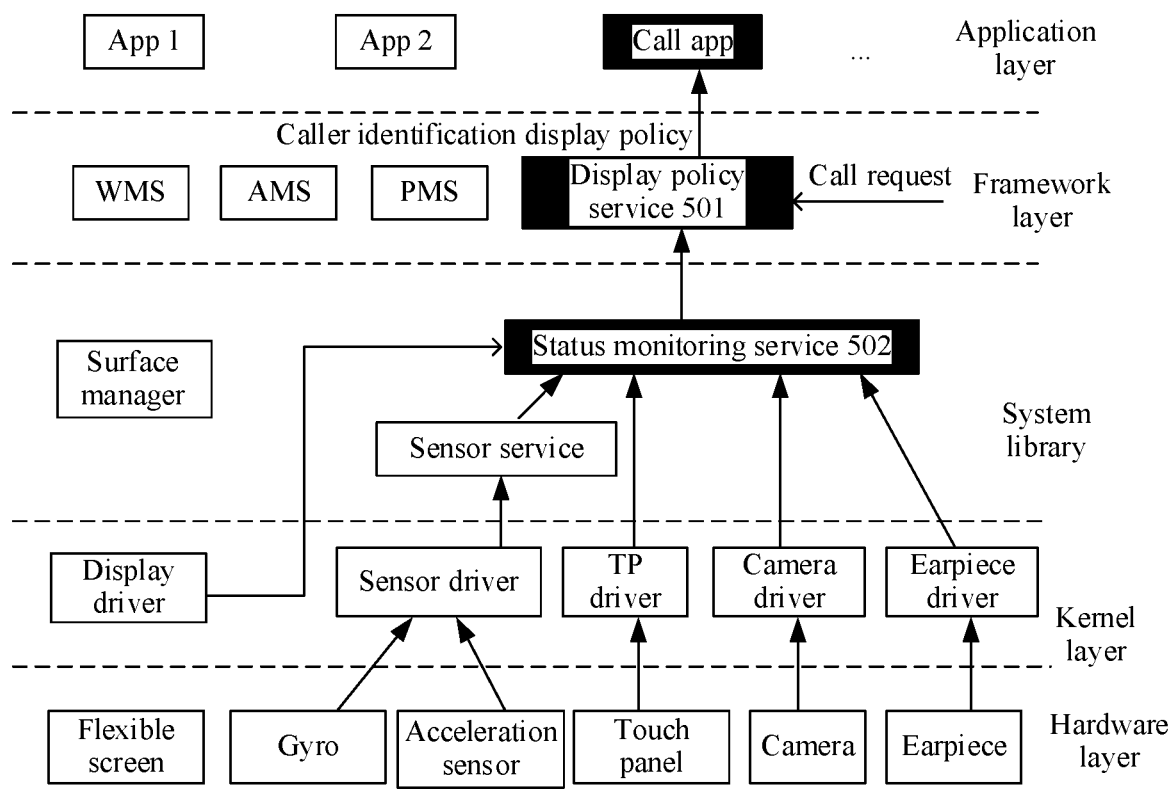
FIG. 5 is a schematic diagram of an architecture of an operating system of an electronic device according to an embodiment of this disclosure.

FIG. 5 is a block diagram of a software structure of a mobile phone 100 according to an embodiment of this disclosure.

In a layered architecture, software is divided into several layers, and each layer has a clear role and task. The layers communicate with each other through a software interface. In some embodiments, an Android system is divided into four layers, and the four layers are respectively an application layer, an application framework layer (or a framework layer), a system library, and a kernel layer from top to bottom. Specific hardware is under the kernel layer.

The application layer may include a series of applications.

As shown in FIG. 5, applications such as Camera, Gallery, Calendar, Phone, Maps, Navigation, BLUETOOTH, Music, Videos, and Messages may be installed at the application layer.

In this embodiment of this disclosure, the application layer includes a call app. A user may receive, by using the call app, a call request sent by a contact. For example, the call request may be a voice call request or a video call request. The call request may be sent through a cellular network (for example, a 4G network or a 5G network), or may be sent through the Internet such as a WI-FI network. Certainly, the user may further send a call request to the contact by using the call app, or the call app may further have another function such as chatting or projection. This is not limited in this embodiment of this disclosure.

The application framework layer provides an application programming interface (API) and a programming framework for an application at the application layer. The application framework layer includes some predefined functions.

As shown in FIG. 5, the application framework layer may include an activity manager service (AMS), a window manager service (WMS), a power manager service (PMS), and the like. Certainly, the application framework layer may further include a content provider, a view system, a resource manager, a notification manager, and the like, which are not shown in FIG. 5. This is not limited in this embodiment of this disclosure.

In this embodiment of this disclosure, still as shown in FIG. 5, a display policy service 501 is further disposed at the application framework layer. The display policy service 501 may be integrated into an original functional module of the application framework layer such as the AMS or the WMS, or the display policy service 501 may be disposed at the application framework layer as an independent functional module.

For example, when the call app at the application layer receives the call request sent by the contact, the call app may request the display policy service 501 to provide a caller identification display policy corresponding to a current call request. Further, the display policy service 501 may obtain a specific parameter that affects a current caller identification display policy. For example, the display policy service 501 may obtain a specific physical form of a current flexible screen from an underlying display system. For example, the flexible screen is in an unfolded state or a folded state. For another example, the display policy service 501 may obtain a current working status of the flexible screen from the PMS, for example, learn of whether the flexible screen is in an unlocked state or a screen-locked state.

Further, the display policy service 501 may determine, based on the obtained parameter, the caller identification display policy corresponding to the current call request. The caller identification display policy may be used to indicate a specific current screen on which incoming call information of the current call request is displayed, in other words, define a target screen corresponding to the current call request. Alternatively, the caller identification display policy may be used to indicate a specific current screen on which prompt information of the current call request is displayed, in other words, define a non-target screen corresponding to the current call request. Usually, a hardware component required for answering the current call request is disposed on a front panel that is of the mobile phone and on which the target screen is located. After answering the current call request on the target screen, the user may more conveniently use a related hardware component to make a call. For example, for the voice call request, the target screen is usually a screen on a panel 1 including an earpiece, and for the video call request, the target screen is usually a screen on a panel 2 including a camera.

Subsequently, the display policy service 501 may report the currently determined caller identification display policy to the call app, so that the call app can invoke, based on the caller identification display policy provided by the display policy service 501, a corresponding interface to display incoming call information such as a name of the contact, an answer button, and a decline button on the target screen, and display, on the non-target screen, the prompt information used to prompt the user to answer the current call request. In this way, for a mobile phone that includes a plurality of screens and that is provided with the flexible screen, in an incoming call scenario, the user may sense the current call request on both the target screen and the non-target screen, and may guide the user to use a most proper target screen to answer a current call.

Still as shown in FIG. 5, a system library, a kernel layer, and the like below the application framework layer may be referred to as an underlying system. The underlying system includes an underlying display system configured to provide a display service. For example, the underlying display system includes a display driver at the kernel layer, a surface manager in the system library, and the like.

In this embodiment of this disclosure, the underlying system further includes a status monitoring service 502 configured to identify a change in a physical form of the flexible screen. The status monitoring service 502 may be independently disposed in the underlying display system, or may be disposed in the system library and/or the kernel layer.

For example, the status monitoring service 502 may invoke a sensor service to start sensors such as a gyro and an acceleration sensor to perform detection. The status monitoring service 502 may calculate an included angle between a first screen and a second screen of the flexible screen based on detection data reported by each sensor. The status monitoring service 502 may determine, based on the included angle between the first screen and the second screen, that the physical form of the flexible screen is the unfolded state or the folded state.

For example, when the included angle between the first screen and the second screen is equal to or close to 180°, the status monitoring service 502 may determine that the current flexible screen is in the unfolded state, or when the included angle between the first screen and the second screen is equal to or close to 0°, the status monitoring service 502 may determine that the current flexible screen is in the folded state. Alternatively, the physical form of the flexible screen may further include a support state. For example, when the included angle between the first screen and the second screen falls within a preset range (for example, 70 degrees (°) to 150°), it may be determined that the flexible screen is in the support state. Alternatively, it may be set that the physical form of the flexible screen includes only two physical forms: the folded state and the unfolded state. When the included angle between the first screen and the second screen is equal to or close to 180°, the status monitoring service 502 may determine that the current flexible screen is in the unfolded state, or when the included angle between the first screen and the second screen is not equal to or not close to 180°, the status monitoring service 502 may determine that the current flexible screen is in the folded state. This is not limited in this embodiment of this disclosure.

In addition, the status monitoring service 502 may report the determined physical form of the flexible screen to the display policy service 501. In this way, in the incoming call scenario, the display policy service 501 may determine the current caller identification display policy with reference to the physical form that is of the current flexible screen and that is reported by the status monitoring service 502. A specific method in which the display policy service 501 determines the caller identification display policy is described in detail in a subsequent embodiment, and therefore, is not described in detail herein.

The system library may include a plurality of functional modules such as a surface manager, a media library, a three-dimensional (3D) graphics processing library (for example, OpenGL Embedded System (ES)), and a two-dimensional (2D) graphics engine (for example, SGL). The surface manager is configured to manage a display subsystem, and provide fusion of 2D and 3D layers for a plurality of applications. The media library supports playback and recording of a plurality of common audio and video formats, static image files, and the like. The media library may support a plurality of audio and video encoding formats such as Moving Picture Experts Group (MPEG)-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG). The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, a sensor driver, a touch panel (TP) driver, an earpiece driver, and the like. This is not limited in this embodiment of this disclosure.

A hardware layer includes a flexible screen, a gyro, an acceleration sensor, a touch panel (which may be integrated into the flexible screen), a camera, and an earpiece that are shown in FIG. 5. Certainly, the hardware layer may further include an infrared sensor, a distance sensor, an optical proximity sensor, and the like that are not shown in the figure.

In this embodiment of this disclosure, a flexible screen disposed on the front panel of the mobile phone is foldable. For example, after the user folds the flexible screen, the mobile phone is divided into a first body and a second body, and the flexible screen on the front panel of the mobile phone is also divided into a first screen and a second screen. In addition, the components such as the camera and the earpiece on the front panel of the mobile phone are also distributed to the first body and the second body. In the following embodiment, an example in which the first screen and the camera are disposed on the first body of the mobile phone and the second screen and the earpiece are disposed on the second body of the mobile phone is used for description.

Figure 6A:
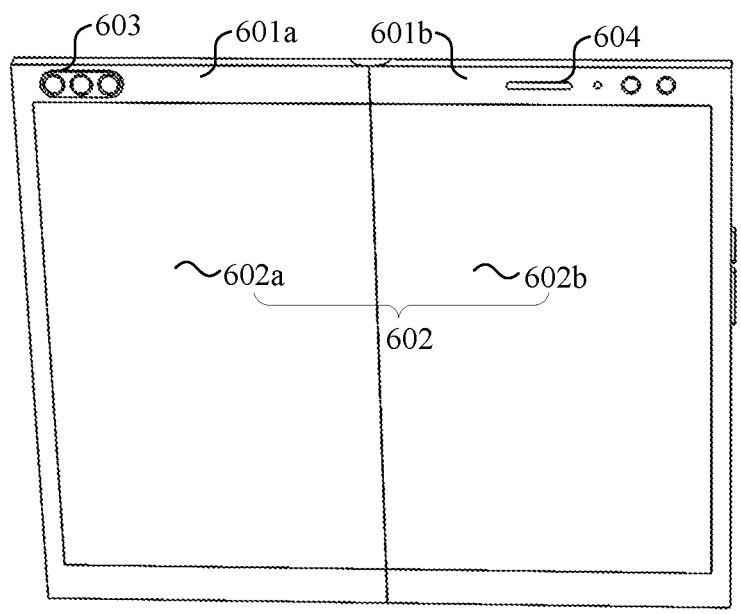
FIGS. 6A-6B show a schematic diagram of an application scenario of an incoming call prompting method according to an embodiment of this disclosure.

As shown in FIG. 6A, components such as a flexible screen 602, a camera 603, and an earpiece 604 are disposed in a mobile phone. When the flexible screen 602 is in an unfolded state, the entire flexible screen 602 may be used as a complete and independent display area for display. When the flexible screen 602 is in a folded state, the mobile phone is divided into a first body 601a and a second body 601b, and the flexible screen 602 is divided into a first screen 602a and a second screen 602b. In this case, the first screen 602a and the camera 603 are disposed on a same side of the first body 601a, and the second screen 602b and the earpiece 604 are disposed on a same side of the second body 601b.

For example, a contact Sam sends a call request to a user. After the user receives, by using the mobile phone, a call request 1 sent by the contact Sam, the mobile phone may determine, by using a display policy service 501 at an application framework layer, a caller identification display policy corresponding to a current call request.

For example, after receiving the call request 1, a call app in the mobile phone may send the request 1 to the display policy service 501, to request the display policy service 501 to provide a caller identification display policy corresponding to the current call request 1. In some embodiments, the call app may use the request 1 to carry a call type (for example, a voice call type or a video call type) of the call request 1, and send the request 1 to the display policy service 501, so that the display policy service 501 can obtain the call type of the current call request 1. Alternatively, the mobile phone may further receive the call request 1 by using a modem. Further, the modem may broadcast information such as a name of the contact, an identifier (ID), and a call type of the call request 1 in an operating system of the mobile phone in a broadcast manner. In this case, after receiving the broadcast, the display policy service 501 may read the call type of the current call request 1 from the broadcast. Subsequently, the display policy service 501 may determine, based on the call type of the current call request 1, the caller identification display policy corresponding to the current call request 1.

For example, the display policy service 501 may obtain a specific physical form of a current flexible screen from the status monitoring service 502. If the current flexible screen is in an unfolded state, the display policy service 501 may determine a caller identification display policy 1 corresponding to the current call request 1. In the caller identification display policy 1, the entire flexible screen 602 may be used as a target screen to display incoming call information of the current call request 1. To be specific, when the flexible screen is in the unfolded state, it indicates that the user currently uses the mobile phone by using the entire flexible screen 602 as a whole. Therefore, regardless of a type of the current call request 1, the mobile phone may display the incoming call information of the call request 1 on the entire flexible screen 602.

Figure 6B:
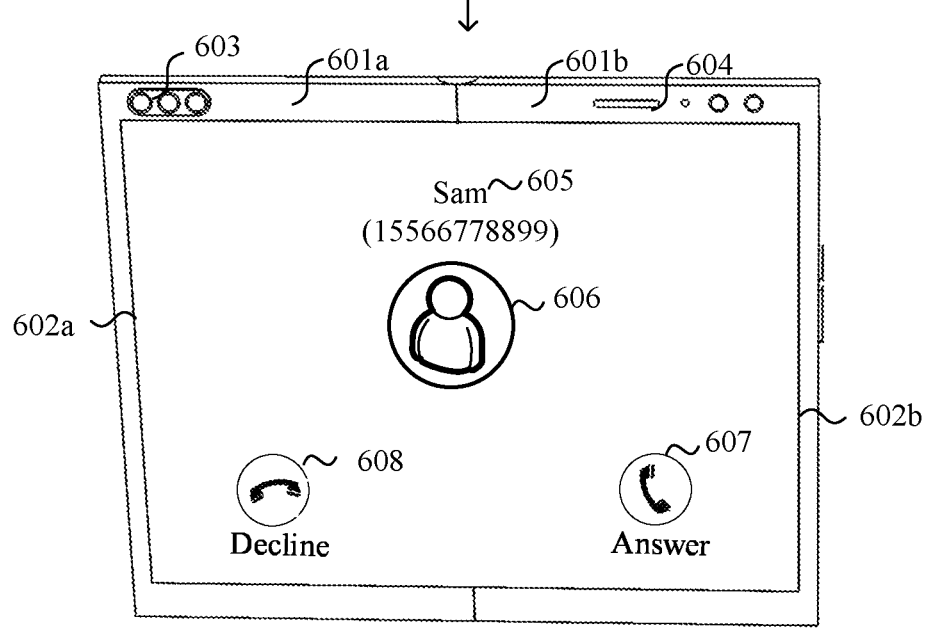

Further, the display policy service 501 may report the determined caller identification display policy 1 to the call app. For example, the display policy service 501 may report an identifier (for example, 001) of the caller identification display policy 1 to the call app. As shown in FIG. 6B, after obtaining the identifier 001 of the caller identification display policy 1, the call app may invoke an interface (for example, an API 01) corresponding to the identifier 001 to display the incoming call information of the call request 1 on the entire flexible screen 602. For example, the incoming call information may include a name 605 of the contact Sam, a profile picture 606 of the contact Sam, an answer button 607, and a decline button 608. The user may perceive the current call request 1 by using the incoming call information, and perform processing such as answering or declining the call request 1. Certainly, the incoming call information may further include controls such as a name of the call app and a hands-free button. This is not limited in this embodiment of this disclosure.

Figure 7:
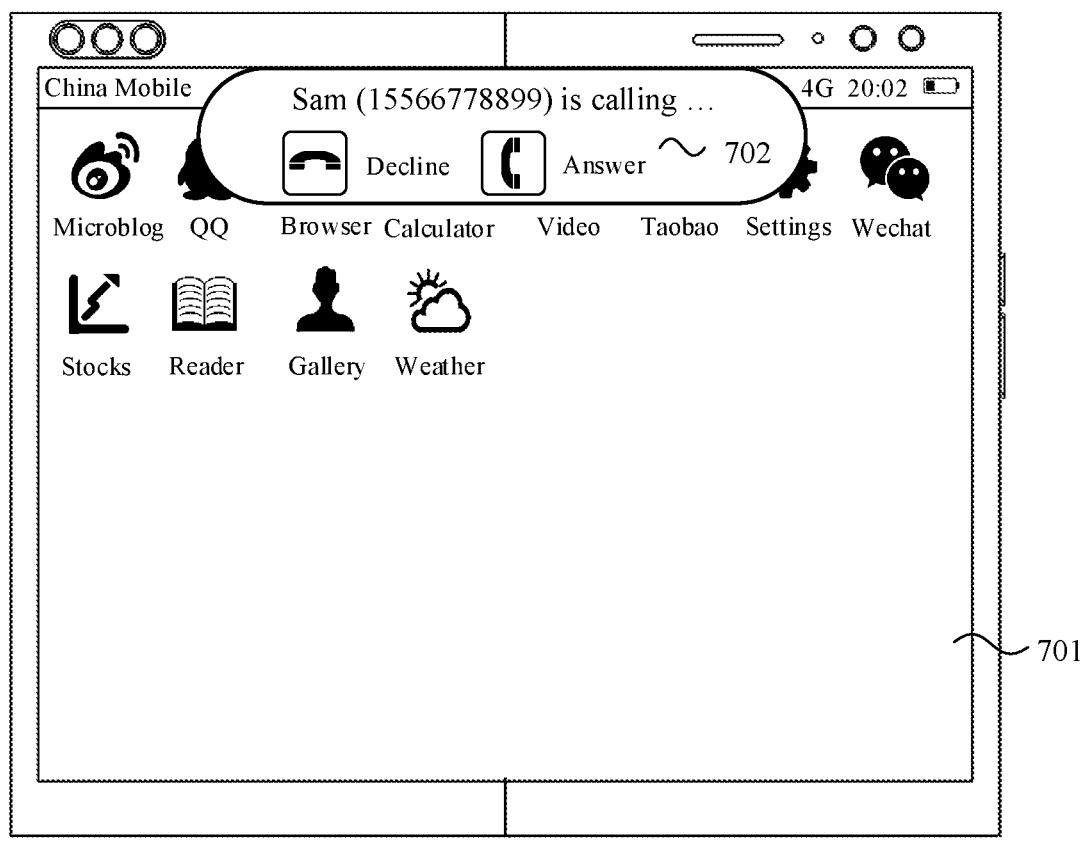
FIG. 7 is a schematic diagram of an application scenario of an incoming call prompting method according to an embodiment of this disclosure.

In some embodiments, when determining the caller identification display policy corresponding to the current call request 1, the display policy service 501 may not only obtain a specific physical form of a current flexible screen from a status monitoring service 502, but also obtain a working status of the current flexible screen 602 from a PMS at the application framework layer. For example, if the physical form of the flexible screen 602 is the unfolded state and the working state of the entire flexible screen 602 is an unlocked state, it indicates that the user is using the unfolded flexible screen 602. In this case, the display policy service 501 may set, in the caller identification display policy 1, that the incoming call information is displayed in a form of a notification message. Subsequently, after the display policy service 501 reports the caller identification display policy 1 to the call app, as shown in FIG. 7, if the flexible screen 602 is displaying a home screen 701 before the mobile phone receives the call request 1, the call app may trigger, in response to the caller identification display policy 1, the mobile phone to display a notification message 702 on the home screen 701. The notification message 702 may include the incoming call information of the current call request 1. Certainly, when the flexible screen 602 is in the unlocked state, the call app may alternatively display the incoming call information on the flexible screen 602 in full screen. This is not limited in this embodiment of this disclosure.

Correspondingly, if the physical form of the flexible screen 602 is the unfolded state and the working state of the flexible screen 602 is a screen-locked state, still as shown in FIG. 6B, the display policy service 501 may indicate the call app to display an incoming call interface on the entire flexible screen 602. The incoming call information is located in the incoming call interface.

Figure 8A:
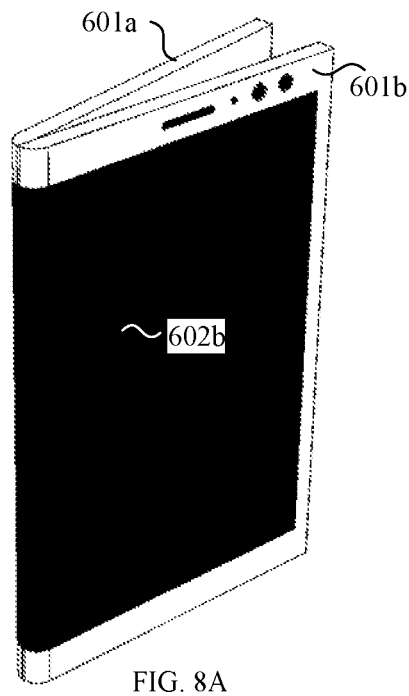
FIGS. 8A-8B show a schematic diagram of an application scenario of an incoming call prompting method according to an embodiment of this disclosure.

In some other embodiments, as shown in FIG. 8A, if the current flexible screen is in the folded state, the first screen 602a (not shown in the figure) and the second screen 602b that are formed after the flexible screen is folded usually work independently as two displays. In this case, the display policy service 501 may determine a corresponding caller identification display policy based on the call type of the current call request 1.

For example, if the call type of the current call request 1 is a video call type, the display policy service 501 may determine a caller identification display policy 2 corresponding to the current call request 1. In the caller identification display policy 2, during a video call, the mobile phone needs to use a camera to collect a video image. The camera 603 of the mobile phone and the first screen 602a are jointly disposed on the first body 601a. Therefore, the first screen 602a may be used as a target screen to display the incoming call information of the current call request 1. In addition, in the caller identification display policy 2, the second screen 602b may be used as a non-target screen to display prompt information of the current call request 1, to prompt the user to answer a current call on the first screen 602a.

Figure 8B:
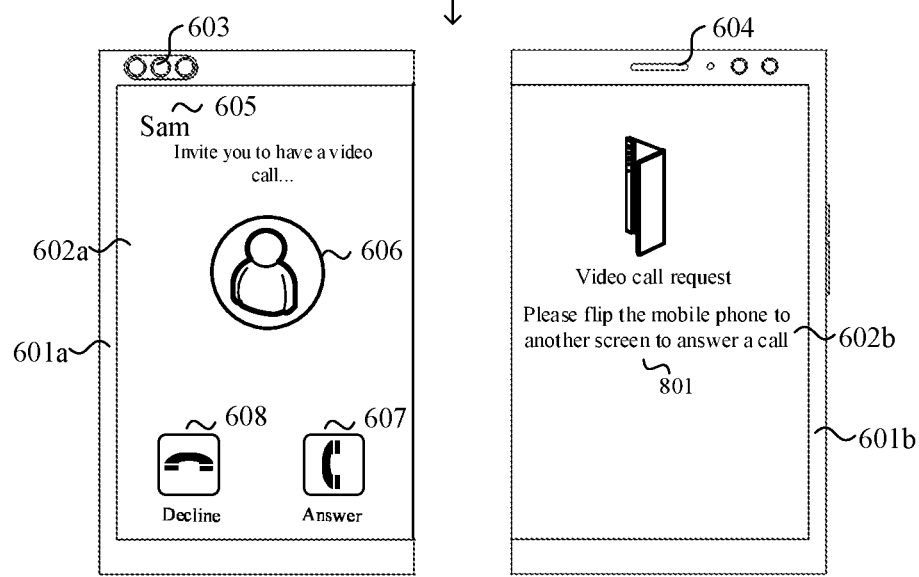

Further, the display policy service 501 may report the determined caller identification display policy 2 to the call app. For example, the display policy service 501 may report an identifier (for example, 002) of the caller identification display policy 2 to the call app. As shown in FIG. 8B, after obtaining the identifier 002 of the caller identification display policy 2, the call app may invoke an interface (for example, an API 02) corresponding to the identifier 002, to display the incoming call information of the current call request 1 on the first screen 602a. The incoming call information may include the name 605 of the contact Sam, the profile picture 606 of the contact Sam, the answer button 607, the decline button 608, and the like. In addition, the call app may further display prompt information 801 of the current call request 1 on the second screen 602b by invoking the API 02, to prompt the user to flip the mobile phone, so as to answer the current call by using the first screen 602a and the camera 603 of the first body 601a.

In this way, when the flexible screen is in the folded state, if the mobile phone receives a video call request sent by the contact, the user may perceive the current video call request by using the incoming call information displayed on the first screen 602a, and the user may also perceive the current video call request by using the prompt information 801 displayed on the second screen 602b. In addition, because the camera 603 required for the video call is disposed on the first body 601a on which the first screen 602a displaying the incoming call information is located, after the user answers the current video call request on the first screen 602a, the user may continue to use the camera 603 to make the video call, so that an answering and call process of the entire video call is smooth, and use experience of the user is higher.

Correspondingly, if the call type of the current call request 1 is a voice call type, the display policy service 501 may determine a caller identification display policy 3 corresponding to the current call request 1. In the caller identification display policy 3, during a voice call, the mobile phone needs to use an earpiece to listen to voice content. The earpiece 604 of the mobile phone and the second screen 602b are jointly disposed on the second body 601b. Therefore, the second screen 602b may be used as the target screen to display the incoming call information of the current call request 1. In addition, in the caller identification display policy 3, the first screen 602a may be used as the non-target screen to display the prompt information of the current call request 1, to prompt the user to answer the current call on the second screen 602b.

Figure 9A:
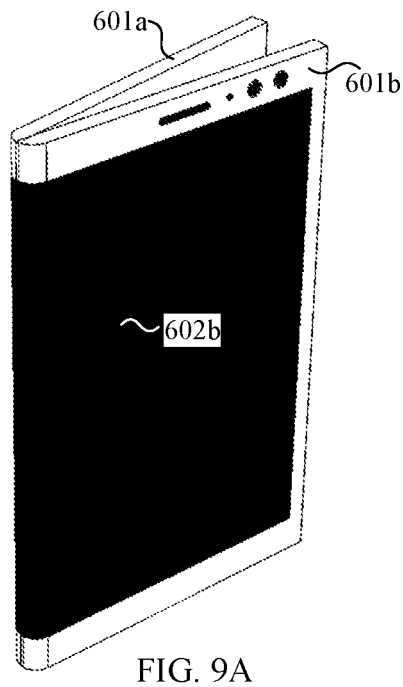
FIGS. 9A-9B show a schematic diagram of an application scenario of an incoming call prompting method according to an embodiment of this disclosure.
Figure 9B:
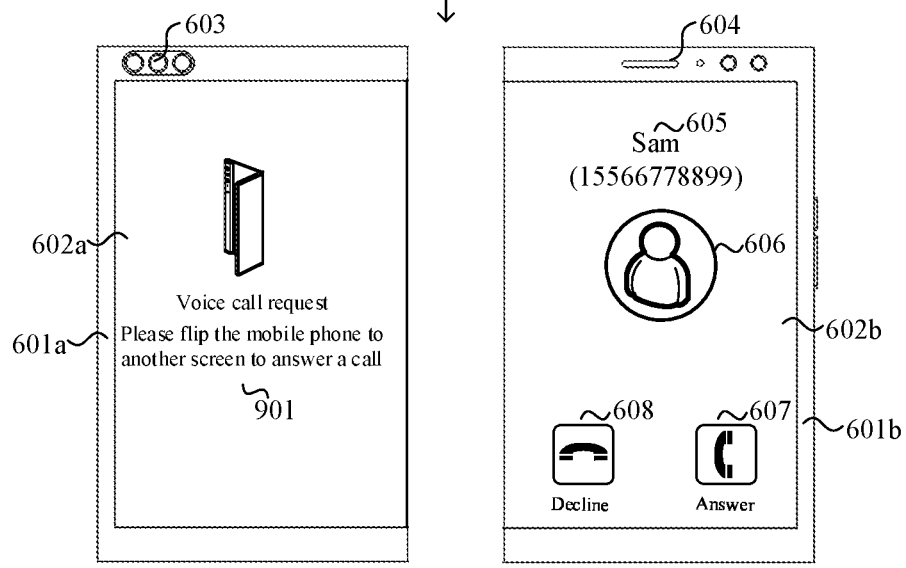

Further, the display policy service 501 may report the determined caller identification display policy 3 to the call app. For example, the display policy service 501 may report an identifier (for example, 003) of the caller identification display policy 3 to the call app. As shown in FIG. 9A, the mobile phone is in the folded state before receiving the call request 1 of a current voice call type. After the mobile phone receives the call request 1 of the current voice call type, if the call app receives the caller identification display policy 3 reported by the display policy service 501, as shown in FIG. 9B, the call app may display the incoming call information of the current call request 1 on the second screen 602b. The incoming call information may include the name 605 of the contact Sam, the profile picture 606 of the contact Sam, the answer button 607, the decline button 608, and the like. In addition, the call app may further display prompt information 901 of the current call request 1 on the first screen 602a, to prompt the user to flip the mobile phone, so as to answer the current call by using the second screen 602b and the earpiece 604 on the second body 601b.

In this way, when the flexible screen is in the folded state, if the mobile phone receives the voice call request sent by the contact, the user may perceive the current voice call request by using the incoming call information displayed on the second screen 602b, and the user may also perceive the current voice call request by using the prompt information 901 displayed on the first screen 602a. In addition, because an earpiece 604 required for a voice call is disposed on the second body 601b on which the second screen 602b displaying the incoming call information is located, after the user answers the current voice call request on the second screen 602b, the user may continue to use the earpiece 604 to make the voice call, so that an answering and call process of the entire voice call is smooth, and use experience of the user is higher.

In some embodiments, when determining the caller identification display policy corresponding to the current call request 1, the display policy service 501 may not only obtain the specific physical form of the current flexible screen from the status monitoring service 502, but also obtain the working status of the current flexible screen from the PMS at the application framework layer. When the flexible screen is in the folded state, the status monitoring service 502 may separately obtain a working status of the first screen 602a and a working status of the second screen 602b of the flexible screen.

That the flexible screen is in the folded state and the call type of the current call request 1 is a video call type is still used as an example. If the display policy service 501 learns that both the first screen 602a and the second screen 602b of the current flexible screen are in a screen-locked state, still as shown in FIGS. 8A-8B, the display policy service 501 may set, in the caller identification display policy 2, that the first screen 602a is used to display the incoming call information of the current call request 1 and the second screen 602b is used to display the prompt information of the current call request 1.

It should be noted that, as shown in FIG. 10A, the prompt information displayed by the mobile phone on the second screen 602b (or the first screen 602a) may include specific information about the contact that sends the current call request 1, for example, a profile picture 1001 of the contact, a name 1002 of the contact, and a call type 1003, and may further include a prompt 1004 "Please flip the mobile phone to another screen to answer a call". Alternatively, to protect privacy of the contact from being disclosed, as shown in FIG. 10B, the prompt information displayed by the mobile phone on the second screen 602b (or the first screen 602a) may include only the prompt 1004 and an incoming call prompt 1005. Alternatively, as shown in FIG. 10C, the prompt information displayed by the mobile phone on the second screen 602b may include only the prompt 1004. Certainly, when displaying the prompt information on the second screen 602b (or the first screen 602a), the mobile phone may further display a preset animation effect to prompt the user with a case in which a new call request is received. This is not limited in this embodiment of this disclosure.

In some embodiments, when declining the call request, the user does not need to use a button such as the earpiece 604 or the camera 603. In this case, as shown in FIG. 11, the prompt information displayed by the mobile phone on the second screen 602b (or the first screen 602a) may further include a decline button 1006. If it is detected that the user taps the decline button 1006, the call app may decline the current call request and end the current call.

Figure 12A:
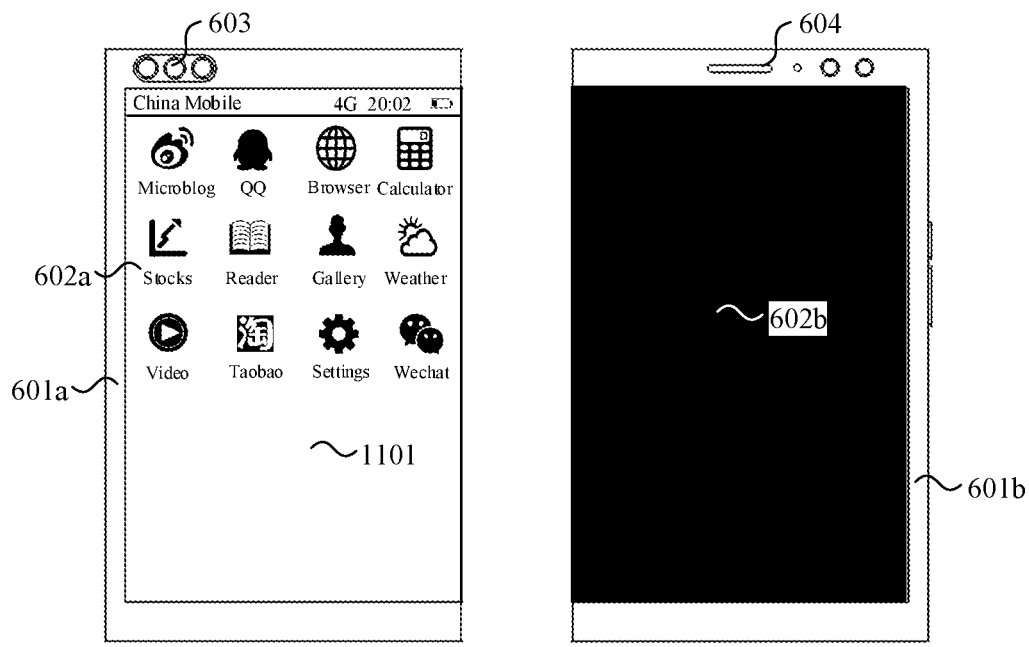
FIGS. 12A-12B show a schematic diagram of an application scenario of an incoming call prompting method according to an embodiment of this disclosure.

That the flexible screen is in the folded state and the call type of the current call request 1 is a video call type is still used as an example. In this case, in the caller identification display policy 2 corresponding to the call request 1, the first screen 602a is the target screen, and the second screen 602b is the non-target screen. If the display policy service 501 learns that the first screen 602a is in the unlocked state and the second screen 602b is in the screen-locked state in the current flexible screen, it indicates that the user is using the first screen 602a and does not use the second screen 602b. For example, as shown in FIG. 12A, before the current call request 1 is received, the first screen 602a of the mobile phone may display a home screen 1101, and the second screen 602b is in the screen-locked state (which may also be referred to as a screen-off state).

Figure 12B:
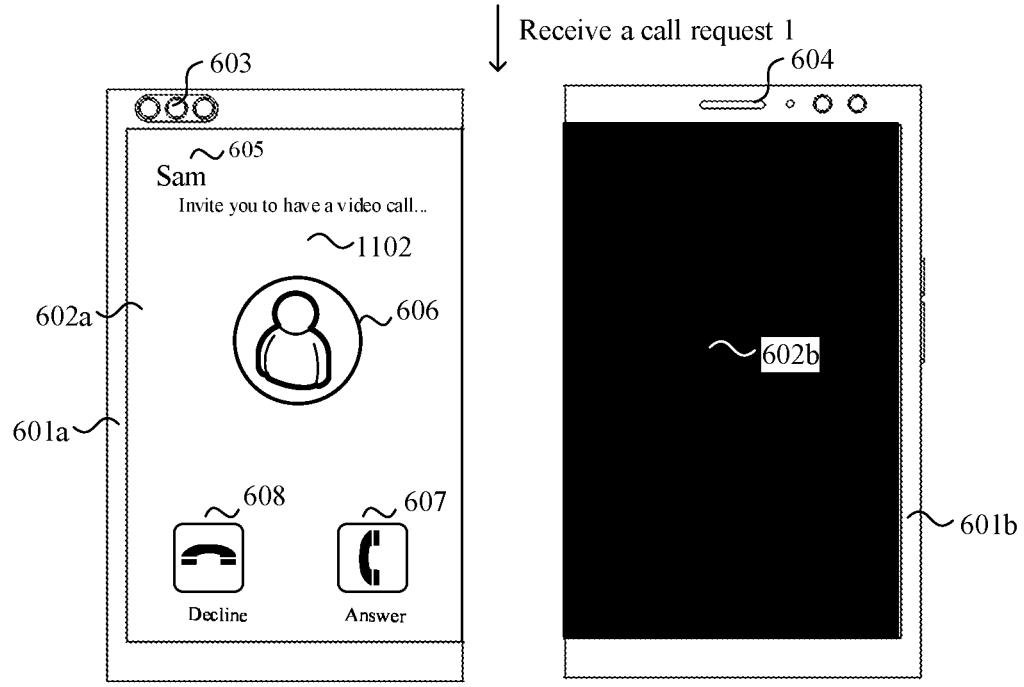

In this case, the display policy service 501 may set, in the caller identification display policy 2, that the first screen 602a (that is, the target screen) is used to display the incoming call information of the current call request 1 and the second screen 602b (that is, the non-target screen) may continue to remain in the screen-locked state and does not need to display the prompt information. Subsequently, as shown in FIG. 12B, the call app may jump, based on the caller identification display policy 2 reported by the display policy service 501, the home screen 1101 originally displayed on the first screen 602a to an incoming call interface 1102, and the incoming call interface 1102 includes the incoming call information of the current call request 1. Because the user is using the first screen 602a, the user may perceive the current call request 1 immediately by using the incoming call information on the first screen 602a. In addition, the camera 603 required for the current video call is disposed on the first body 601a on which the first screen 602a is located. Therefore, after answering the current call on the first screen 602a, the user may use the camera 603 to make the current call. In this case, the mobile phone does not need to display the prompt information on the second screen 602b to prompt the user to answer the call on the first screen 602a, thereby reducing power consumption overheads of the mobile phone.

Alternatively, when displaying the incoming call information on the first screen 602a in the unlocked state, the mobile phone may further display the incoming call information in a form of a notification message, to avoid excessive disturbance caused by the user to an application or a service that is running on the first screen 602a. This is not limited in this embodiment of this disclosure.

Figure 13A:
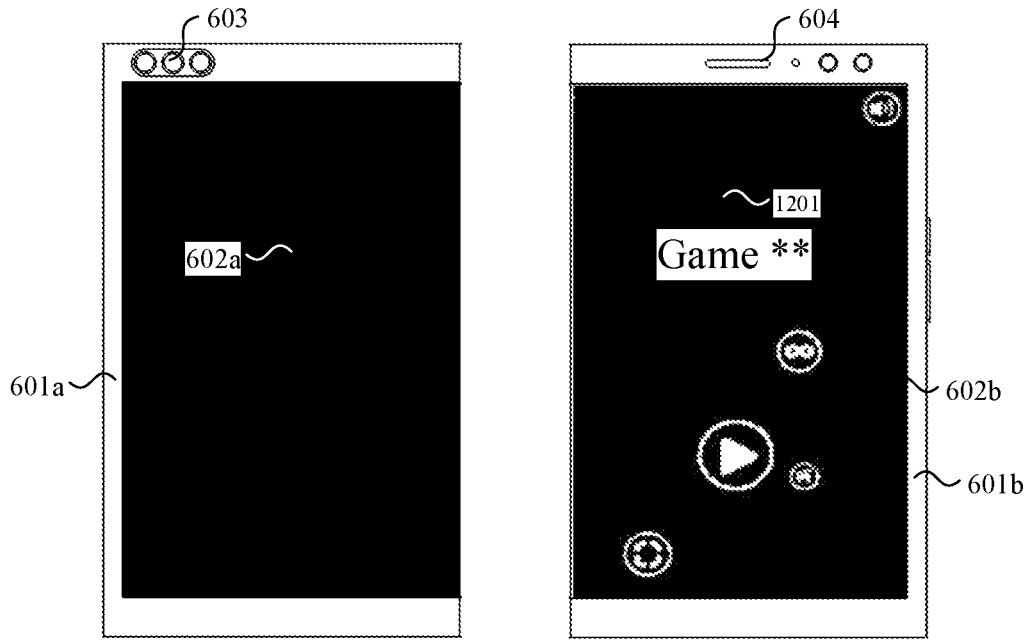
FIGS. 13A-13B show a schematic diagram of an application scenario of an incoming call prompting method according to an embodiment of this disclosure.

That the flexible screen is in the folded state and the call type of the current call request 1 is a video call request is still used as an example. If the display policy service 501 learns that the first screen 602a of the current flexible screen is in the screen-locked state and the second screen 602b of the current flexible screen is in the unlocked state, in other words, if the target screen is in the screen-locked state and the non-target screen is not in the unlocked state, it indicates that the user is using the second screen 602b (the non-target screen) and does not use the first screen 602a (the target screen). For example, as shown in FIG. 13A, before the current call request 1 is received, the first screen 602a of the mobile phone is in a screen-locked state, and the second screen 602b of the mobile phone may display an application interface 1201 of a game application.

Because a camera required for a video call is disposed on the first body 601a on which the first screen 602a is located, that is, the first screen 602a is a target screen, the display policy service 501 may set, in the caller identification display policy 2, that the first screen 602a is used as the target screen to display the incoming call information of the current call request 1, and display the prompt information of the current call request 1 on the second screen 602b. Because the user is using the second screen 602b, the display policy service 501 may set, in the caller identification display policy 2, that the prompt information is displayed on the second screen 602b in a form of a notification message, to reduce disturbance caused by the user to an application or a service that is running on the second screen 602b.

Figure 13B:
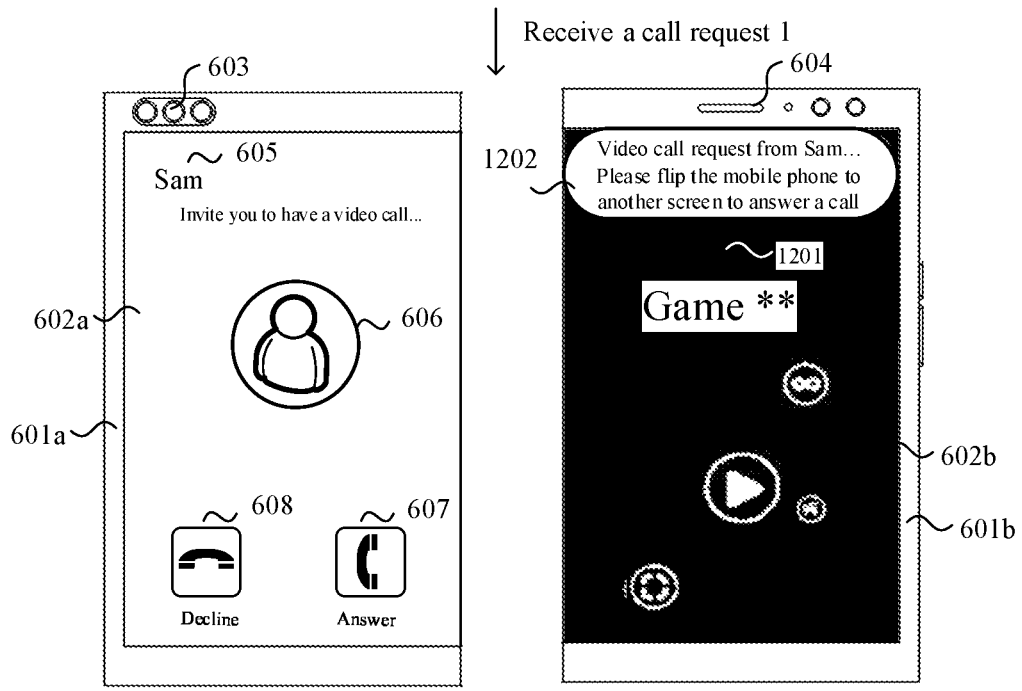

Subsequently, as shown in FIG. 13B, the call app may display the incoming call information of the current call request 1 on the first screen 602a based on the caller identification display policy 2 reported by the display policy service 501, and display a notification message 1202 in the application interface 1201 that is being displayed on the second screen 602b. The notification message 1202 includes a prompt message that is used to prompt the user to use the first screen 602a to answer the current call. For example, the prompt message may be prompting the user to flip the mobile phone to the first screen 602a to process the current call request 1.

In some embodiments, if the second screen 602b (that is, the non-target screen) is in an unlocked state, the display policy service 501 may further obtain a specific application that is running on the second screen 602b. For example, the display policy service 501 may query, from an AMS at the application framework layer, a package name of an application that is running on the second screen 602b. Further, the display policy service 501 may identify, based on the package name of the application that is running on the second screen 602b, whether the application that is running on the second screen 602b is a preset application with high immersive experience, for example, a game app, a video app, or a navigation app. If the preset application such as the game app is running on the second screen 602b, to improve immersive experience of using the application by the user on the second screen 602b, the display policy service 501 may further set, in the caller identification display policy 2, that an answer button and a decline button of the current call request 1 are displayed in the notification message 1202.

Figure 14:
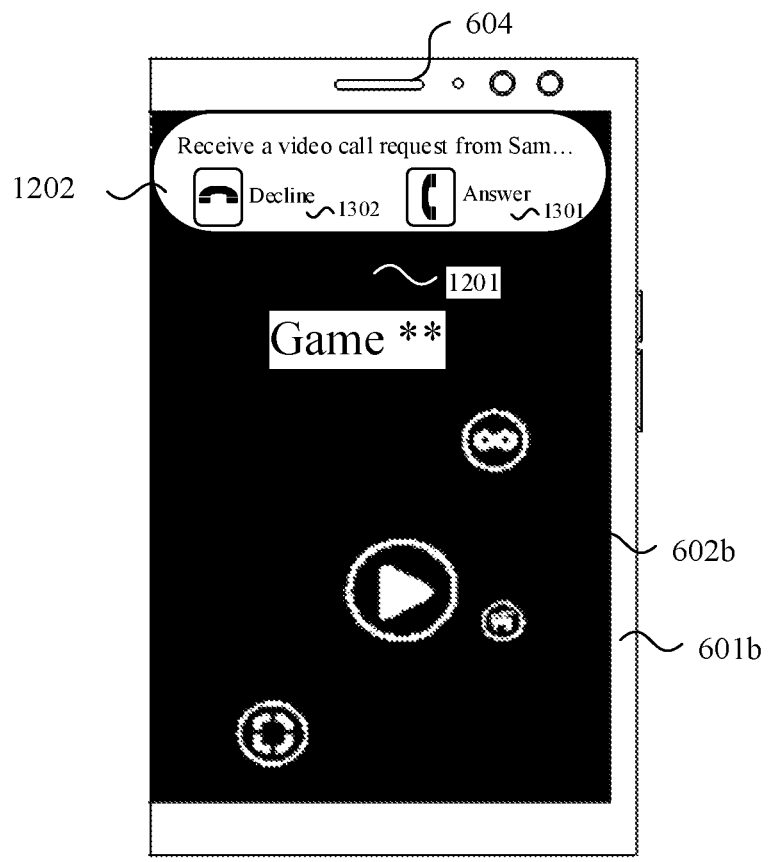
FIG. 14 is a schematic diagram of an application scenario of an incoming call prompting method according to an embodiment of this disclosure.

In this case, as shown in FIG. 14, the call app may display the notification message 1202 on the second screen 602b based on the caller identification display policy 2. The notification message 1202 includes an answer button 1301 and a decline button 1302. In this case, although the second screen 602b is not a target screen corresponding to the current video call request, the user may still operate the answer button 1301 or the decline button 1302 in the notification message 1202 to process the current call request 1, and does not need to flip the mobile phone to the first screen 602a to process the current call request 1 by using the incoming call information displayed on the first screen 602a, to avoid disturbance generated by the current call request 1 to the application or the service running on the second screen 602b.

For example, still as shown in FIG. 14, after the call app displays the notification message 1202 in the application interface 1201, if it is detected that the user taps the answer button 1301 in the notification message 1202, the call app may automatically switch the current video call to the voice call. For example, the call app may invoke a speaker to answer the current voice call in a hands-free manner. In this way, disturbance generated by a received video call when the user runs a specific application such as a game on the non-target screen can be reduced, and use experience of the user can be improved. Certainly, after the user taps the answer button 1301 in the notification message 1202, the call app may also complete the current video call based on an implementation procedure of the video call. This is not limited in this embodiment of this disclosure.

Figure 15:
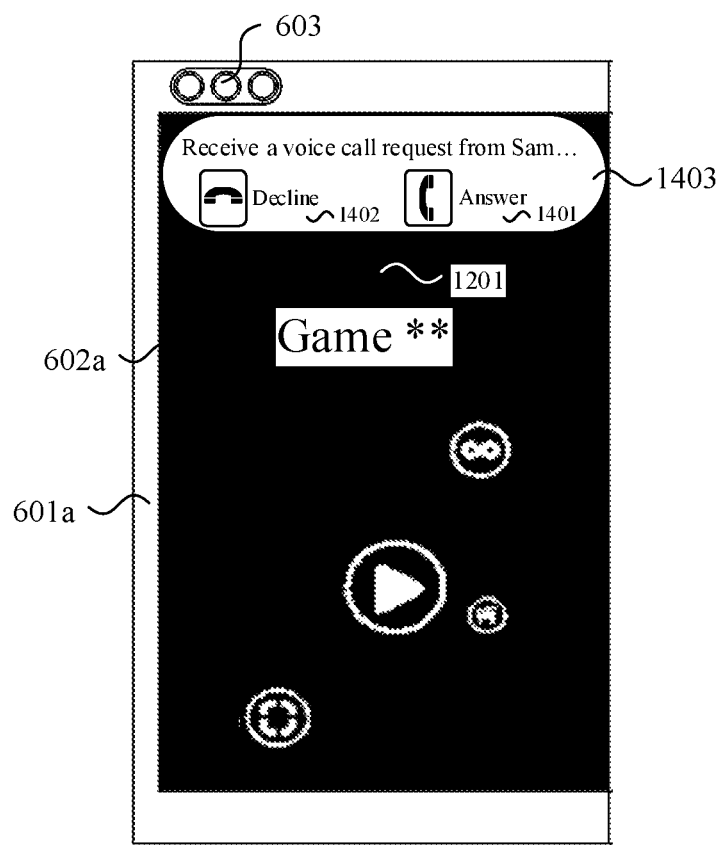
FIG. 15 is a schematic diagram of an application scenario of an incoming call prompting method according to an embodiment of this disclosure.

In some other embodiments, when the mobile phone receives the voice call request sent by the contact, because the voice call may be answered by using a speaker in addition to an earpiece, as shown in FIG. 15, when the mobile phone receives the voice call request sent by the contact, if the display policy service 501 detects that the preset application (for example, the game app) is running on the first screen 602a (or the second screen 602b), it indicates that the user is using the first screen 602a (or the second screen 602b) to have immersive function experience. In this case, the display policy service 501 may indicate the call app to display an answer button 1401 and a decline button 1402 of the current voice call request on the first screen 602a (or the second screen 602b) on which the game app runs. For example, the answer button 1401 and the decline button 1402 may be displayed in an application interface of the game app in a form of a notification message 1403. In this case, if the user taps the decline button 1402, the mobile phone may decline the voice call request. If the user taps the answer button 1401, the mobile phone may answer the current voice call request in a hands-free manner by using the speaker.

In other words, regardless of whether the first screen 602a (or the second screen 602b) on which the preset application (for example, the game app) is running is the target screen corresponding to the current voice call request, if the mobile phone receives the voice call request when running the game app, the mobile phone may answer the current voice call request by using the speaker by default. In this way, the voice call request does not need to be limited to being answered on the front panel of the mobile phone on which an earpiece is disposed. The user can process the current voice call request when using a preset application with high immersive experience on any screen, to improve call use experience of the user.

In some other embodiments, when the mobile phone receives the voice call request sent by the contact, the display policy service 501 in the mobile phone may further query whether the mobile phone is currently connected to an audio output device. For example, the mobile phone may be connected to the audio output device, for example, a wired headset, a BLUETOOTH speaker, a BLUETOOTH headset, an in-vehicle infotainment system, a WI-FI speaker, or a smart watch. In this case, audio output by the mobile phone may be played by a currently connected audio output device. Similarly, the voice call request currently received by the mobile phone does not need to be limited to being answered on the front panel that is of the mobile phone and on which the earpiece is disposed, and the user may play voice content of the current voice call by using the audio output device connected to the mobile phone. In this case, if the display policy service 501 finds, through query, that the mobile phone is currently connected to the audio output device, the display policy service 501 may indicate the call app to display the incoming call information of the current voice call request on the first screen 602a and/or the second screen 602b. The incoming call information includes an answer button and a decline button.

Figure 16:
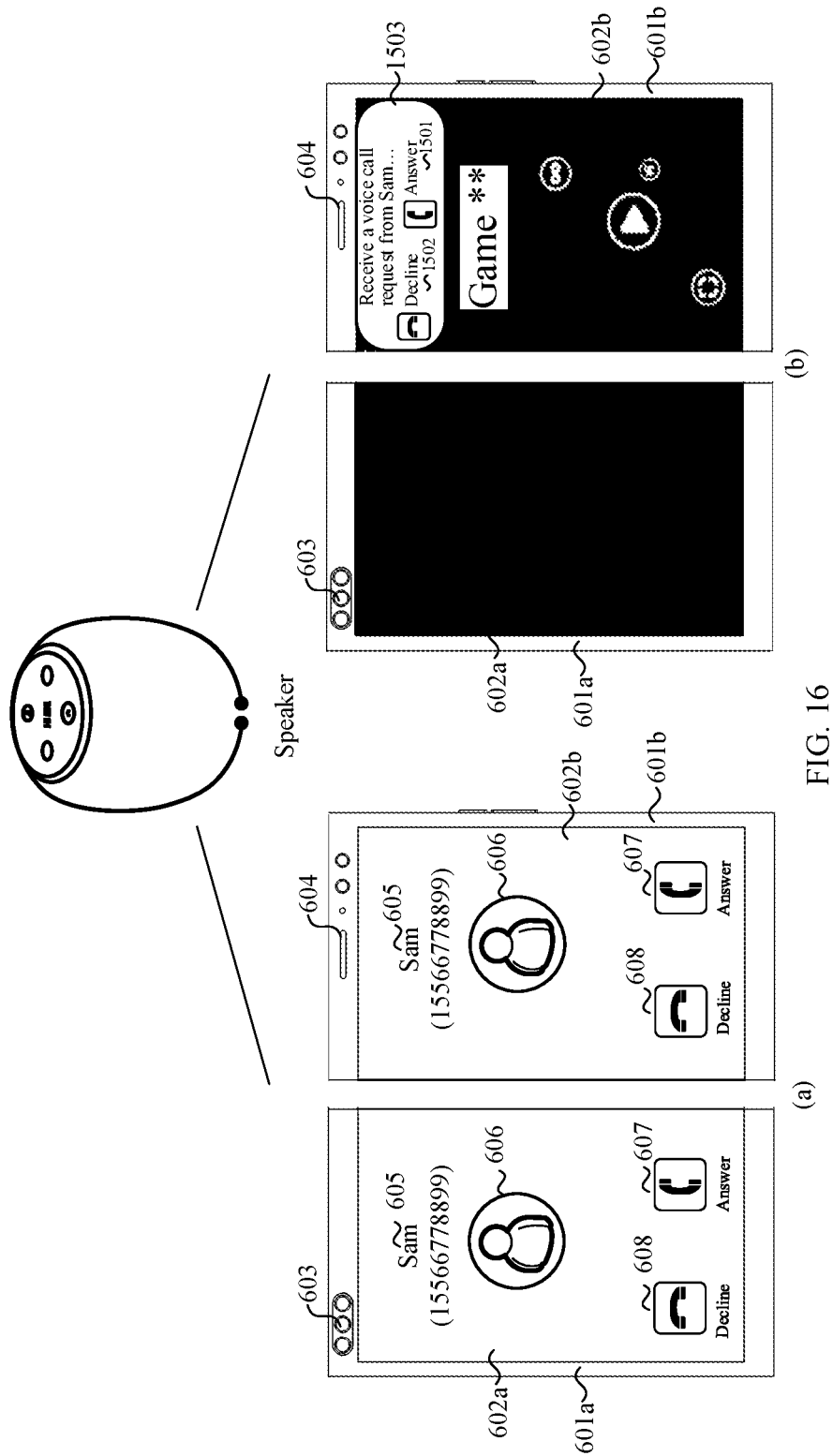
FIG. 16 is a schematic diagram of an application scenario of an incoming call prompting method according to an embodiment of this disclosure.

For example, as shown in a first scenario (labeled (a)) in FIG. 16, the audio output device of the mobile phone is a sound box. When the flexible screen is in the folded state, and both the first screen 602a and the second screen 602b are in the screen-locked state, the mobile phone may display the incoming call information of the current voice call request on both the first screen 602a and the second screen 602b. The incoming call information includes an answer button 1501 and a decline button 1502. In this way, the user may perceive the current voice call request on both the first screen 602a and the second screen 602b, and may process the current voice call request by using the answer button 1501 and the decline button 1502. Certainly, the mobile phone may alternatively select one of the first screen 602a and the second screen 602b to display the incoming call information. This is not limited in this embodiment of this disclosure.

For another example, the audio output device of the mobile phone is still a sound box. When the flexible screen is in the folded state, and one of the first screen 602a and the second screen 602b is in the screen-locked state, as shown in a second scenario (labeled (b)) in FIG. 16, the first screen 602a is in the screen-locked state, the second screen 602b is in the unlocked state, and a game app runs on the second screen 602b. In this case, the mobile phone may display the incoming call information in a form of a notification message 1503 on the second screen 602b in the unlocked state. The incoming call information includes an answer button 1501 and a decline button 1502. If the user taps the decline button 1502, the mobile phone may decline the voice call request. If the user taps the answer button 1501, the mobile phone may listen, by using the sound box, to voice content sent by the contact in the current voice call. In addition, the mobile phone does not need to display the incoming call information or the prompt information on the first screen 602a in the screen-locked state, and may continue to maintain the screen-locked state of the first screen 602a, to reduce power consumption overheads of the mobile phone.

In some other embodiments, when an electronic device connected to the mobile phone has a camera, the mobile phone may collect display data by using a camera of the electronic device. To be specific, the image input device of the mobile phone is the electronic device. In this case, the call request of the video call type may not depend on the camera on the front panel of the mobile phone. In this way, the video call request received by the mobile phone does not need to be limited to being answered on the front panel of the mobile phone on which the camera is disposed, and the user may collect a video image of the current video call by using the camera of the electronic device connected to the mobile phone.

Figure 17:
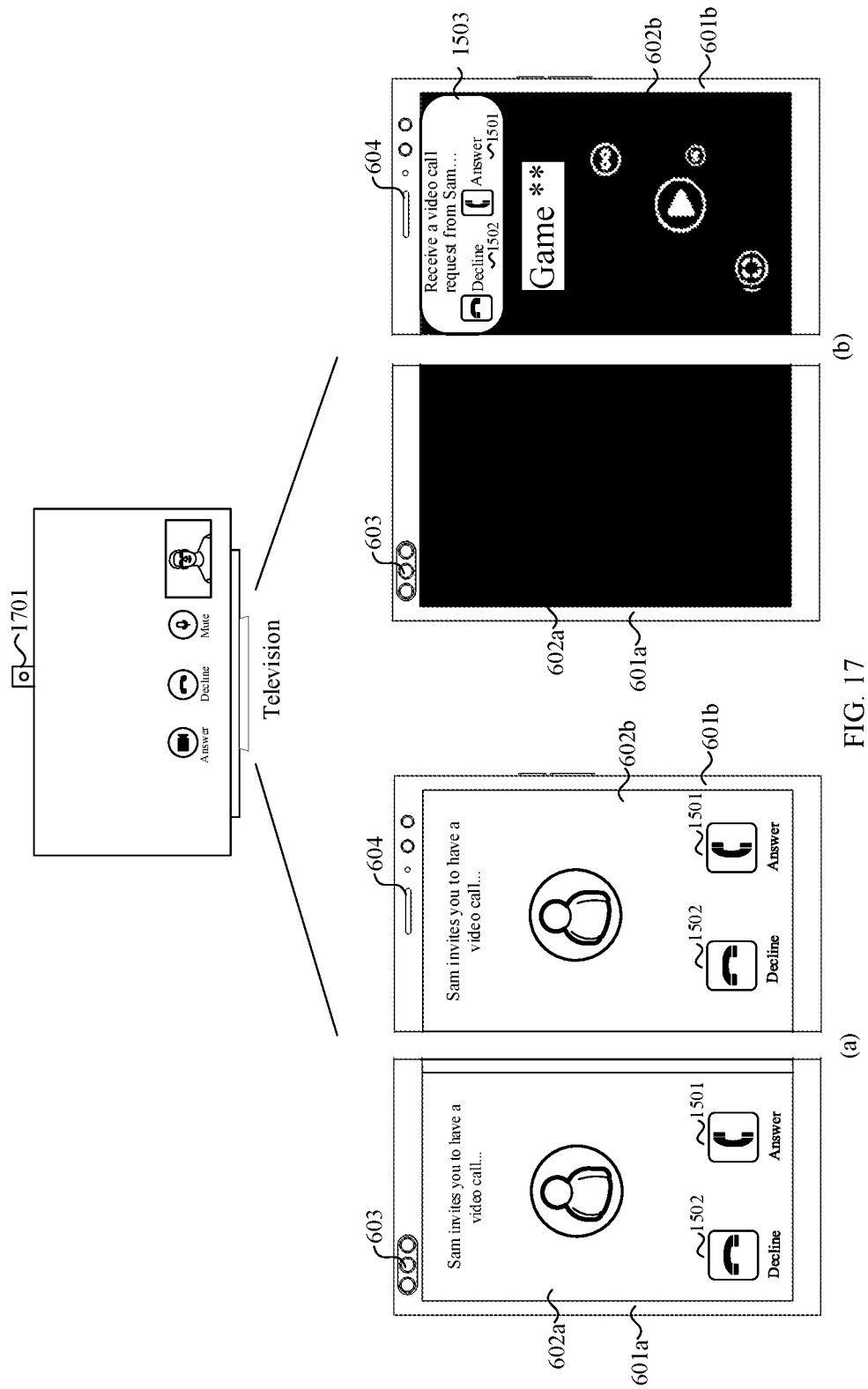
FIG. 17 is a schematic diagram of an application scenario of an incoming call prompting method according to an embodiment of this disclosure.

For example, as shown in a first scenario (labeled (a)) in FIG. 17, the mobile phone is connected to a television, and a camera 1701 is disposed in the television. After the mobile phone receives the video call request sent by the contact, if both the first screen 602a and the second screen 602b are in the screen-locked state, the mobile phone may display the incoming call information of the current video call request on both the first screen 602a and the second screen 602b. The incoming call information includes an answer button 1501 and a decline button 1502. In this way, the user may perceive the current video call request on both the first screen 602*a* and the second screen 602*b*, and may process the current voice call request by using the answer button 1501 and the decline button 1502. If it is detected that the user taps the answer button 1501, the mobile phone may complete the current video call by using the camera 1701 of the television. Certainly, the mobile phone may alternatively select one of the first screen 602*a* and the second screen 602*b* to display the incoming call information. This is not limited in this embodiment of this disclosure. In some embodiments, the mobile phone may further indicate the television to display the incoming call information of the current video call request on a display of the television, for example, the answer button 1501 and the decline button 1502.

For another example, after the mobile phone receives the video call request sent by the contact, if one of the first screen 602*a* and the second screen 602*b* is in the screen-locked state, as shown in second scenario (labeled (b)) in FIG. 17, the first screen 602*a* is in the screen-locked state, the second screen 602*b* is in the unlocked state, and a game app runs on the second screen 602*b*. In this case, the mobile phone may display the incoming call information in a form of a notification message 1503 on the second screen 602*b* in the unlocked state. The incoming call information includes the answer button 1501 and the decline button 1502. If the user taps the decline button 1502, the mobile phone may decline the voice call request. If the user taps the answer button 1501, the mobile phone may complete the current video call by using the camera 1701 of the television. In addition, the mobile phone does not need to display the incoming call information or the prompt information on the first screen 602*a* in the screen-locked state, and may continue to maintain the screen-locked state of the first screen 602*a*, to reduce power consumption overheads of the mobile phone.

Figure 18:
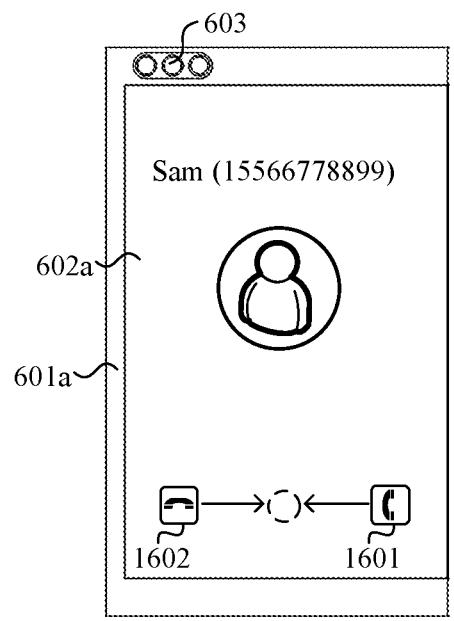
FIG. 18 is a schematic diagram of an application scenario of an incoming call prompting method according to an embodiment of this disclosure.

In some embodiments, when the display policy service 501 sets, in the current caller identification display policy, that the incoming call information is displayed on the target screen and the prompt information is displayed on the non-target screen, the user may need to flip the mobile phone to find the target screen corresponding to the current call request, to perform an operation such as answering or declining the current call request on the target screen. In a flipping process, the user may wrongly operate the answer button or the decline button. Therefore, as shown in FIG. 18, when the call app displays the answer button 1601 and the decline button 1602 in the incoming call information on the first screen 602*a* (or the second screen 602*b*), the answer button 1601 and the decline button 1602 may be set to have a display effect in an accidental touch avoidance mode. For example, the call app may set an answer operation to an operation of sliding the answer button 1601 to a preset location, and set a decline operation as an operation of sliding the decline button 1602 to a preset location, to reduce a probability that the user wrongly touches the answer button 1601 or the decline button 1602 and answers or declines the current call request. Certainly, a person skilled in the art may alternatively set the answer button 1601 and the decline button 1602 to have a display effect in an accidental touch avoidance mode by reducing sizes of the answer button 1601 and the decline button 1602. This is not limited in this embodiment of this disclosure.

In some other embodiments, when the flexible screen is in the folded state, the display policy service 501 may further identify a specific direction of the mobile phone. For example, when both the first screen 602*a* and the second screen 602*b* are in the screen-locked state, the mobile phone may detect, by using the gravity sensor, whether the mobile phone is in a static state. When the mobile phone is in the static state, the mobile phone may further determine, by using the gravity direction detected by the gravity sensor, that the screen facing upward in this case is the first screen 602*a* or the second screen 602*b*.

For example, the first screen 602*a* is a screen facing upward. If the first screen 602*a* is the target screen corresponding to the current call request, the mobile phone may directly display the corresponding incoming call information on the first screen 602*a*, and does not need to display the corresponding prompt information on the second screen 602*b*, to reduce power consumption of the mobile phone. If the first screen 602*a* is not the target screen corresponding to the current call request, the mobile phone may display the prompt information of the current call request on the first screen 602*a*, and display the incoming call information of the current call request on the second screen 602*b*.

Alternatively, when the first screen 602*a* and/or the second screen 602*b* are/is in the unlocked state, the display policy service 501 may identify, based on detection data reported by a sensor such as an acceleration sensor, a gyro camera, an infrared sensor, an optical proximity sensor, or a TP, that a screen facing the user in this case is the first screen 602*a* or the second screen 602*b*.

Figure 19A:
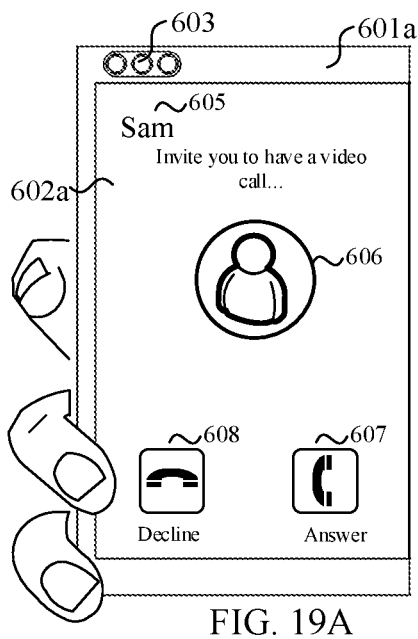
FIGS. 19A-19B show a schematic diagram of an application scenario of an incoming call prompting method according to an embodiment of this disclosure.

That the first screen 602*a* faces the user is used as an example. In this case, display content on the first screen 602*a* is within a line-of-sight range of the user. As shown in FIG. 19A, if the current call request is a video call request, because the target screen corresponding to the video call request is the first screen 602*a*, the display policy service 501 may indicate the call app to display the incoming call information of the current call request on the first screen 602*a*, and the user may answer or decline the current call request by using the incoming call information on the first screen 602*a*. In addition, when the flexible screen is in the folded state and the first screen 602*a* faces the user, it indicates that the second screen 602*b* does not face the user, that is, content on the second screen 602*b* is not within a line-of-sight range of the user. In this case, the mobile phone does not need to display the prompt information of the current call request on the second screen 602*b* (not shown in the figure), to reduce power consumption overheads of the mobile phone.

Figure 19B:
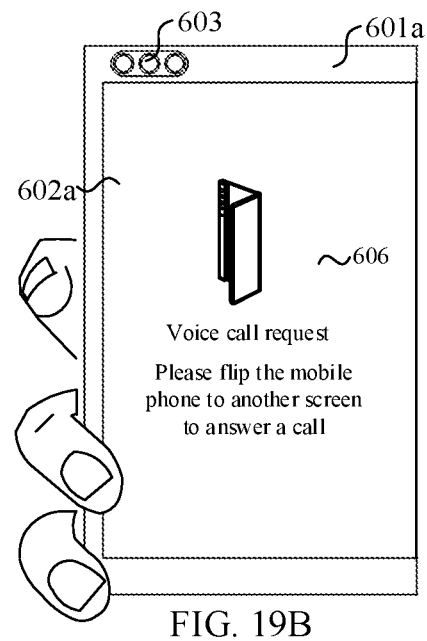

That the first screen 602*a* faces the user is still used as an example. As shown in FIG. 19B, if the current call request is a voice call request, because the target screen corresponding to the voice call request is the second screen 602*b*, the display policy service 501 may indicate the call app to display the prompt information of the current call request on the first screen 602*a*, to prompt the user to flip the mobile phone to answer the current call request by using the second screen 602*b*. In addition, the mobile phone may display the incoming call information of the current call request on the second screen 602*b* (not shown in the figure), and the user may answer or decline the current call request by using the incoming call information on the second screen 602*b*.

Similarly, if the second screen 602*b* faces the user, when the second screen 602*b* is the target screen corresponding to the current call request, the mobile phone may directly display the corresponding incoming call information on the second screen 602*b*, and does not need to display the corresponding prompt information on the first screen 602*a*, to reduce power consumption overheads of the mobile phone. If the second screen 602*b* is not the target screen corresponding to the current call request, the mobile phone may display the prompt information of the current call request on the second screen 602*b*, and display the incoming call information of the current call request on the first screen 602*a*.

It can be understood that, that the first screen 602*a* (or the second screen 602*b*) faces the user in this embodiment of this disclosure may include that the first screen 602*a* (or the second screen 602*b*) faces the user at a basically parallel angle, or may include that the first screen 602*a* (or the second screen 602*b*) faces the user at a specific tilt angle. In this case, the mobile phone may be in a static state, or may be in a moving state. This is not limited in this embodiment of this disclosure.

It should be noted that, in this embodiment, that the first screen 602*a* and the camera 603 are disposed on the first body 601*a* and the second screen 602*b* and the earpiece 604 are disposed on the second body 601*b* is used as an example for description. Because the first screen 602*a* and the camera 603 are disposed on the first body 601*a*, the first screen 602*a* may be used as the target screen of the video call request. Because the second screen 602*b* and the earpiece 604 are disposed on the second body 601*b*, the second screen 602*b* may be used as the target screen of the voice call request, and the user may perform an operation such as answering or declining the voice call request or the video call request on the target screen.

In this case, if the first screen 602*a* and the earpiece 604 are disposed on the first body 601*a*, the first screen 602*a* may be used as the target screen of the voice call request, and if the second screen 602*b* and the camera 603 are disposed on the second body 601*b*, the second screen 602*b* may be used as the target screen of the video call request. After answering the current voice call request or video call request on the target screen, the user may more conveniently use a related hardware component to make a call.

Figure 20:
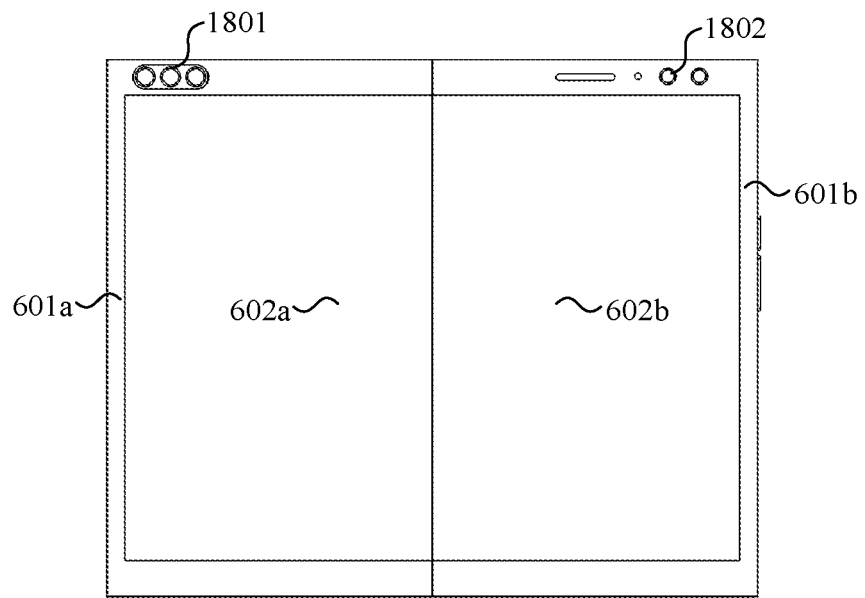
FIG. 20 is a schematic diagram of an application scenario of an incoming call prompting method according to an embodiment of this disclosure.

In some other embodiments, a component required for the video call (or the voice call) may be disposed on a front panel that is of the mobile phone and on which a plurality of screens is located. As shown in FIG. 20, a first camera 1801 and the first screen 602*a* are disposed on the first body 601*a*, and a second camera 1802 and the second screen 602*b* are disposed on the second body 601*b*. In this case, when the mobile phone receives the video call request sent by the contact, the mobile phone may determine, based on photographing parameters of the first camera 1801 and the second camera 1802, the target screen corresponding to the current video call request. For example, if a quantity of lenses in the first camera 1801 is greater than a quantity of lenses in the second camera 1802, the mobile phone may determine that the first screen 602*a* in the first body 601*a* is the target screen of the current video call. For another example, if resolution of the second camera 1802 is greater than resolution of the first camera 1801, the mobile phone may determine that the second screen 602*b* in the second body 601*b* is the target screen of the current video call. In other words, when a plurality of hardware components on the front panel of the mobile phone meet a requirement of the current call request, the mobile phone may select, as the target screen of the current call request based on hardware parameters of these hardware components, a screen on a front panel that is of the mobile phone and on which a hardware component with better component performance is located.

In addition, in this embodiment, that the flexible screen of the mobile phone is divided into the first screen 602*a* and the second screen 602*b* after being folded is used as an example for description. It can be understood that the flexible screen may be further divided into three or more screens after being folded. Alternatively, the mobile phone may be provided with a plurality of flexible screens. Alternatively, the mobile phone may be further provided with one or more conventional unfoldable screens in addition to the flexible screen. When the mobile phone includes a plurality of screens, the mobile phone may set, in the method in this embodiment, a corresponding caller identification display policy in an incoming call scenario for display. This is not limited in this embodiment of this disclosure.

Figure 21:
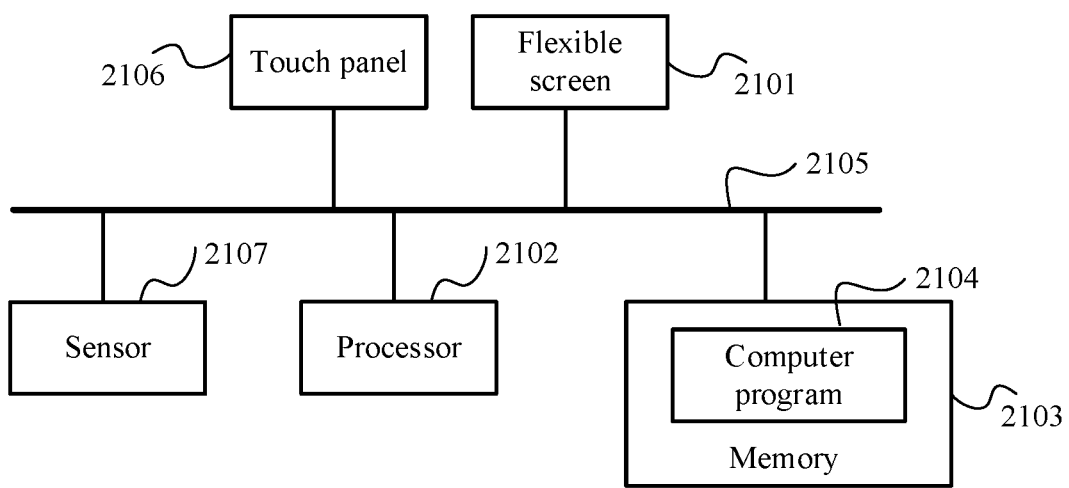
FIG. 21 is a schematic diagram of a structure of an electronic device according to an embodiment of this disclosure.

An embodiment of this disclosure discloses an electronic device. As shown in FIG. 21, the electronic device may include a flexible screen 2101, a touch panel 2106 (the flexible screen 2101 and the touch panel 2106 may be integrated into a touchscreen), one or more processors 2102, one or more memories 2103, one or more sensors 2107, one or more applications (not shown), and one or more computer programs 2104. The foregoing components may be connected through one or more communications buses 2105. The one or more computer programs 2104 are stored in the memory 2103, and are configured to be executed by the one or more processors 2102, the one or more computer programs 2104 include instructions, and the instructions may be used to perform steps in the foregoing embodiments. All related content of the steps in the method embodiments may be cited in function descriptions of corresponding physical components. Details are not described herein again.

For example, the processor 2102 may be the processor 110 shown in FIG. 2, the memory 2103 may be the internal memory 121 shown in FIG. 2, the flexible screen 2101 may be the flexible screen on the display 194 shown in FIG. 2, and the sensor 2107 may be one or more of a gyro sensor, an acceleration sensor, an optical proximity sensor, an infrared sensor, a Hall effect sensor, or the like in the sensor module 180 shown in FIG. 2. This is not limited in this embodiment of this disclosure.

Based on the descriptions of the implementations, a person skilled in the art may clearly understand that for the purpose of convenient and brief descriptions, division into the functional modules is merely used as an example for description. In an actual application, the functions can be allocated to different functional modules for implementation based on a requirement. In other words, an inner structure of an apparatus is divided into different functional modules, to implement all or some of the foregoing described functions. For a specific working process of the system, apparatus and unit, refer to a corresponding process in the method embodiments. Details are not described herein again.

Functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this disclosure. The foregoing storage medium includes any medium that can store program code, for example, a flash memory, a removable hard disk, a read-only memory (ROM), a RAM, a magnetic disk, or an optical disc.

The foregoing descriptions are merely specific implementations of embodiments of this disclosure, but are not intended to limit the protection scope of embodiments of this disclosure. Any variation or replacement within the technical scope disclosed in embodiments of this disclosure shall fall within the protection scope of embodiments of this disclosure. Therefore, the protection scope of embodiments of this disclosure shall be subject to the protection scope of the claims.

What is claimed is:

1. A method implemented by an electronic device, wherein the method comprises:
   receiving a call request from a contact;
   determining, in response to the call request and when a flexible screen of the electronic device is in a folded state, a target screen corresponding to the call request, wherein the target screen is a first screen of the flexible screen or a second screen of the flexible screen;
   displaying, on the target screen, an answer button that answers the call request, wherein the target screen is the first screen when the call request is a video call request, and wherein the target screen is the second screen when the call request is a voice call request; and
   displaying prompt information of the call request on a non-target screen, wherein the prompt information prompts a user to answer the call request using the answer button, wherein the non-target screen is the second screen when the call request is a video call request, and wherein the non-target screen is the first screen when the call request is a voice call request.

2. The method of claim 1, wherein the prompt information comprises at least one of a name of the contact, a profile picture of the contact, a call type of the call request, or a preset prompt, and wherein the preset prompt prompts the user to flip the electronic device.

3. The method of claim 2, wherein the prompt information further comprises a decline button, and wherein the decline button is for declining the call request.

4. The method of claim 1, wherein after determining the target screen, the method further comprises displaying, on the target screen, a decline button is for declining the call request.

5. The method of claim 1, further comprising displaying the prompt information on the non-target screen when the target screen is in a screen-locked state.

6. The method of claim 5, further comprising:
   identifying, after the target screen is in the screen-locked state, that the target screen is in an unlocked state; and
   skipping displaying, the prompt information on the non-target screen in response to identifying that the target screen is in the unlocked state.

7. The method of claim 1, further comprising displaying the prompt information on the non-target screen when the non-target screen is facing the user.

8. The method of claim 7, further comprising:
   identifying, after the non-target screen is facing the user, that the target screen is facing the user; and
   skipping displaying, in response to identifying that the target screen faces the user, the prompt information on the non-target screen in response to identifying that the target screen is facing the user.

9. The method of claim 1, wherein displaying the non-target screen comprises:
   displaying the prompt information on the non-target screen in full screen; or
   displaying, on the non-target screen, a notification message comprising the prompt information.

10. The method of claim 9, further comprising further displaying the notification message on the non-target screen when the electronic device runs a preset application on the non-target screen.

11. The method of claim 10, wherein the notification message comprises the answer button and a decline button for declining the call request.

12. The method of claim 11, wherein the call request is a voice call request, and wherein the method further comprises:
    determining whether to connect to a preset audio output device;
    identifying that the electronic device is not coupled to the preset audio output device; and
    determining, in response to identifying that the electronic device is not coupled to the preset audio output device, that the target screen is the second screen.

13. An electronic device comprising:
    a flexible screen comprising a first screen and a second screen and configured to fold into a folded state; and
    one or more processors coupled to the flexible screen and configured to:
      receive a call request from a contact;
      determine, in response to the call request, a target screen corresponding to the call request when the flexible screen is in the folded state, wherein the target screen is the first screen or the second screen;
      display, on the target screen, an answer button answering the call request, wherein the target screen is the first screen when the call request is a video call request, and wherein the target screen is the second screen when the call request is a voice call request; and
      display, on a non-target screen, prompt information prompting a user to answer the call request using the answer button, wherein the non-target screen is the second screen when the call request is a video call request, and wherein the non-target screen is the first screen when the call request is a voice call request.

14. The electronic device of claim 13, wherein after determining the target screen the one or more processors are further configured to display, on the target screen, a decline button declining the call request.

15. The electronic device of claim 13, wherein the one or more processors are further configured to:
    identify that the target screen is in a screen-locked state; and
    display, in response to identifying that the target screen is in the screen-locked state, the prompt information on the non-target screen.

16. The electronic device of claim 13, wherein the one or more processors are further configured to:
    identify that the non-target screen is facing the user; and
    display, in response to identifying that the non-target screen is facing the user, the prompt information on the non-target screen.

17. The electronic device of claim 13, wherein the call request is a voice call request, and wherein the one or more processors are further configured to:
    determine whether to couple to a preset audio output device;
    identify that the electronic device is not coupled to the preset audio output device; and determine, in response to identifying that the electronic device is not coupled to the preset audio output device, that the target screen is the second screen.

18. The electronic device of claim 13, wherein the call request is a video call request, and wherein the one or more processors are further configured to:
determine whether to couple to a preset image input device;
identify that the electronic device is not coupled to the preset image input device; and
determine, in response to identifying that the electronic device is not coupled to the preset image input device, that the target screen is the first screen.

19. The electronic device of claim 13, further comprising:
a first body comprising a first camera and the first screen; and
a second body comprising an earpiece and the second screen, wherein when the flexible screen is in the folded state, the electronic device is divided into the first body and the second body.

20. The electronic device of claim 19, wherein the second body further comprises a second camera, and wherein when the call request is a video call request, the one or more processors are further configured to determine, based on a first hardware parameter of the first camera and a second hardware parameter of the second camera, whether to use the first camera or the second camera to answer the video call request.

* * * * *